(12) United States Patent
Kim et al.

(10) Patent No.: US 11,586,370 B2
(45) Date of Patent: Feb. 21, 2023

(54) MEMORY CONTROLLER AND METHOD OF OPERATING THE SAME

(71) Applicant: SK hynix Inc., Icheon (KR)

(72) Inventors: Jung Ae Kim, Icheon (KR); Beom Rae Jeong, Icheon (KR)

(73) Assignee: SK hynix Inc., Icheon (KR)

( * ) Notice: Subject to any disclaimer, the term of this patent is extended or adjusted under 35 U.S.C. 154(b) by 12 days.

(21) Appl. No.: 17/240,859

(22) Filed: Apr. 26, 2021

(65) Prior Publication Data

US 2022/0129180 A1 Apr. 28, 2022

(30) Foreign Application Priority Data

Oct. 22, 2020 (KR) .......................... 10-2020-0137783

(51) Int. Cl.
*G06F 3/06* (2006.01)

(52) U.S. Cl.
CPC .......... *G06F 3/0646* (2013.01); *G06F 3/0604* (2013.01); *G06F 3/0679* (2013.01)

(58) Field of Classification Search
CPC ....................................................... G06F 3/06
See application file for complete search history.

(56) References Cited

U.S. PATENT DOCUMENTS

| 2014/0208156 | A1* | 7/2014 | Muralimanohar | .... G06F 3/0625 714/6.24 |
| 2015/0332770 | A1* | 11/2015 | Kim | ....................... G11C 16/20 365/185.12 |
| 2019/0196905 | A1* | 6/2019 | Nemoto | ................. G11C 29/76 |
| 2019/0205247 | A1* | 7/2019 | Lin | ........................ G06F 11/14 |
| 2020/0233739 | A1* | 7/2020 | Oh | ......................... G11C 29/44 |
| 2021/0397352 | A1* | 12/2021 | Muthiah | ............... G06F 3/0679 |
| 2022/0066651 | A1* | 3/2022 | Miller | .................. G06F 3/0619 |

FOREIGN PATENT DOCUMENTS

| KR | 10-2015-0130638 A | 11/2015 |
| KR | 10-2020-0048499 A | 5/2020 |

\* cited by examiner

*Primary Examiner* — Stephanie Wu

(57) ABSTRACT

A memory controller and a method of operating the same may provide recovery from a Sudden Power-Off (SPO). The memory controller may control a memory device including a plurality of memory blocks, each memory block having a plurality of pages. The memory controller may include a dummy program controller configured to, after an SPO has occurred while a program operation was being performed on a page of the memory device, control a dummy program operation for recovering from the SPO; a parity data controller configured to control resetting and generation of parity data for chipkill decoding based on pages on which the dummy program operation is determined to be performed; and a valid data controller configured to control movement of valid data based on a number of pages on which the dummy program operation is to be performed.

20 Claims, 15 Drawing Sheets

FIG. 4

| BLK1 | BLK2 | BLK3 | BLK4 | |
|---|---|---|---|---|
| PAGE1_1 | PAGE1_2 | PAGE1_3 | PAGE1_4 | |
| PAGE2_1 | PAGE2_2 | PAGE2_3 | PAGE2_4 | |
| PAGE3_1 | PAGE3_2 | PAGE3_3 | PAGE3_4 | CK_GROUP1 |
| PAGE4_1 | PAGE4_2 | PAGE4_3 | PAGE4_4 | |
| PAGE5_1 | PAGE5_2 | PAGE5_3 | PAGE5_4 | |
| PAGE6_1 | PAGE6_2 | PAGE6_3 | PAGE6_4 | |
| PAGE7_1 | PAGE7_2 | PAGE7_3 | PAGE7_4 | |
| PAGE8_1 | PAGE8_2 | PAGE8_3 | PAGE8_4 | CK_GROUP2 |
| PAGE9_1 | PAGE9_2 | PAGE9_3 | PAGE9_4 | |
| PAGE10_1 | PAGE10_2 | PAGE10_3 | PAGE10_4 | |
| PAGE11_1 | PAGE11_2 | PAGE11_3 | PAGE11_4 | |
| PAGE12_1 | PAGE12_2 | PAGE12_3 | PAGE12_4 | |
| PAGE13_1 | PAGE13_2 | PAGE13_3 | PAGE13_4 | CK_GROUP3 |
| PAGE14_1 | PAGE14_2 | PAGE14_3 | PAGE14_4 | |
| PAGE15_1 | PAGE15_2 | PAGE15_3 | PAGE15_4 | |

FIG. 7

| | BLK1 | BLK2 | BLK3 | BLK4 | |
|---|---|---|---|---|---|
| | PAGE1_1 | PAGE1_2 | PAGE1_3 | PAGE1_4 | |
| | PAGE2_1 | PAGE2_2 | PAGE2_3 | PAGE2_4 | |
| | PAGE3_1 | PAGE3_2 | PAGE3_3 | PAGE3_4 | CK_GROUP1 |
| | PAGE4_1 | PAGE4_2 | PAGE4_3 | PAGE4_4 | |
| | PAGE5_1 | PAGE5_2 | PAGE5_3 | PAGE5_4 | |
| | PAGE6_1 | PAGE6_2 | PAGE6_3 | PAGE6_4 | |
| | PAGE7_1 | PAGE7_2 | PAGE7_3 | PAGE7_4 | |
| | PAGE8_1 | PAGE8_2 | PAGE8_3 | PAGE8_4 | CK_GROUP2 |
| | PAGE9_1 | PAGE9_2 | PAGE9_3 | PAGE9_4 | DUMMY PROGRAM |
| | PAGE10_1 | PAGE10_2 | PAGE10_3 | PAGE10_4 | |
| | PAGE11_1 | PAGE11_2 | PAGE11_3 | PAGE11_4 | |
| | PAGE12_1 | PAGE12_2 | PAGE12_3 | PAGE12_4 | |
| | PAGE13_1 | PAGE13_2 | PAGE13_3 | PAGE13_4 | CK_GROUP3 |
| | PAGE14_1 | PAGE14_2 | PAGE14_3 | PAGE14_4 | |
| | PAGE15_1 | PAGE15_2 | PAGE15_3 | PAGE15_4 | |

FIG. 8

| BLK1 | BLK2 | BLK3 | BLK4 | |
|---|---|---|---|---|
| PAGE1_1 | PAGE1_2 | PAGE1_3 | PAGE1_4 | |
| PAGE2_1 | PAGE2_2 | PAGE2_3 | PAGE2_4 | |
| PAGE3_1 | PAGE3_2 | PAGE3_3 | PAGE3_4 | CK_GROUP1 |
| PAGE4_1 | PAGE4_2 | PAGE4_3 | PAGE4_4 | |
| PAGE5_1 | PAGE5_2 | PAGE5_3 | PAGE5_4 | |
| PAGE6_1 | PAGE6_2 | PAGE6_3 | PAGE6_4 | |
| PAGE7_1 | PAGE7_2 | PAGE7_3 | PAGE7_4 | DUMMY PROGRAM |
| PAGE8_1 | PAGE8_2 | PAGE8_3 | PAGE8_4 | |
| PAGE9_1 | PAGE9_2 | PAGE9_3 | PAGE9_4 | CK_GROUP2 |
| PAGE10_1 | PAGE10_2 | PAGE10_3 | PAGE10_4 | |
| PAGE11_1 | PAGE11_2 | PAGE11_3 | PAGE11_4 | |
| PAGE12_1 | PAGE12_2 | PAGE12_3 | PAGE12_4 | |
| PAGE13_1 | PAGE13_2 | PAGE13_3 | PAGE13_4 | CK_GROUP3 |
| PAGE14_1 | PAGE14_2 | PAGE14_3 | PAGE14_4 | |
| PAGE15_1 | PAGE15_2 | PAGE15_3 | PAGE15_4 | |

MEMORY CONTROLLER AND METHOD OF OPERATING THE SAME

CROSS-REFERENCE TO RELATED APPLICATION

The present application claims priority under 35 U.S.C. § 119(a) to Korean patent application number 10-2020-0137783, filed on Oct. 22, 2020, in the Korean Intellectual Property Office, the entire disclosure of which is incorporated herein by reference.

BACKGROUND

1. Technical Field

Various embodiments of the present disclosure generally relate to an electronic device, and more particularly to a memory controller and a method of operating the memory controller.

2. Related Art

A storage device is a device which stores data under the control of a host device such as a computer, a smartphone, or a smartpad. Examples of the storage device include a device such as a hard disk drive (HDD) which stores data in a magnetic disk, and a device such as a solid state drive (SSD) or a memory card which stores data in a semiconductor memory, particularly, a nonvolatile memory, according to the device in which data is stored.

The storage device may include a memory device in which data is stored and a memory controller which controls the storage of data in the memory device. Such memory devices may be classified into a volatile memory and a nonvolatile memory. Representative examples of the nonvolatile memory include a read only memory (ROM), a programmable ROM (PROM), an electrically programmable ROM (EPROM), an electrically erasable programmable ROM (EEPROM), a flash memory, a phase-change random access memory (PRAM), a magnetic RAM (MRAM), a resistive RAM (RRAM), and a ferroelectric RAM (FRAM).

SUMMARY

Various embodiments of the present disclosure are directed to a memory controller that efficiently performs a recovery operation in the event of a sudden power-off, and a method of operating the memory controller.

An embodiment of the present disclosure may provide for a memory controller for controlling a memory device including a plurality of memory blocks, each memory block having a plurality of pages. The memory controller may include a dummy program controller configured to, after a sudden power-off has occurred while a program operation was being performed on a page selected from among the plurality of pages of one of the memory blocks, control a dummy program operation for recovering from the sudden power-off, a parity data controller configured to control resetting and generation of parity data for chipkill decoding based on pages on which the dummy program operation is determined to be performed and a valid data controller configured to control movement of valid data based on a number of pages on which the dummy program operation is to be performed.

An embodiment of the present disclosure may provide for a method of operating a memory controller, the memory controller controlling a memory device including a plurality of memory blocks, each memory blocks having a plurality of pages. The method may include sensing a sudden power-off occurring while a program operation is being performed on a page from among the plurality of pages of the plurality of memory blocks, during a recovery operation performed after the sudden power-off has been sensed, determining pages on which a dummy program operation is to be performed from among the plurality of pages of the plurality of memory blocks, controlling resetting and generation of parity data for chipkill decoding based on the pages on which the dummy program operation is to be performed and moving valid data based on a number of pages on which the dummy program operation is to be performed.

BRIEF DESCRIPTION OF THE DRAWINGS

FIG. 4 illustrates the generation and programming of parity data.

FIG. 7 illustrates an embodiment in which parity data is generated while a chipkill group unit is maintained.

FIG. 8 illustrates an embodiment in which parity data is generated while a chipkill group unit is changed.

DETAILED DESCRIPTION

Specific structural or functional descriptions in the embodiments of the present disclosure introduced in this specification or application are only for description of the embodiments of the present disclosure. Embodiments should not be construed as being limited to the embodiments described in the specification or application.

Various embodiments of the present disclosure will now be described more fully hereinafter with reference to the accompanying drawings, in which illustrative embodiments of the present disclosure are described, so that those of ordinary skill in the art can easily carry out the technical idea of the present disclosure.

Figure 1:
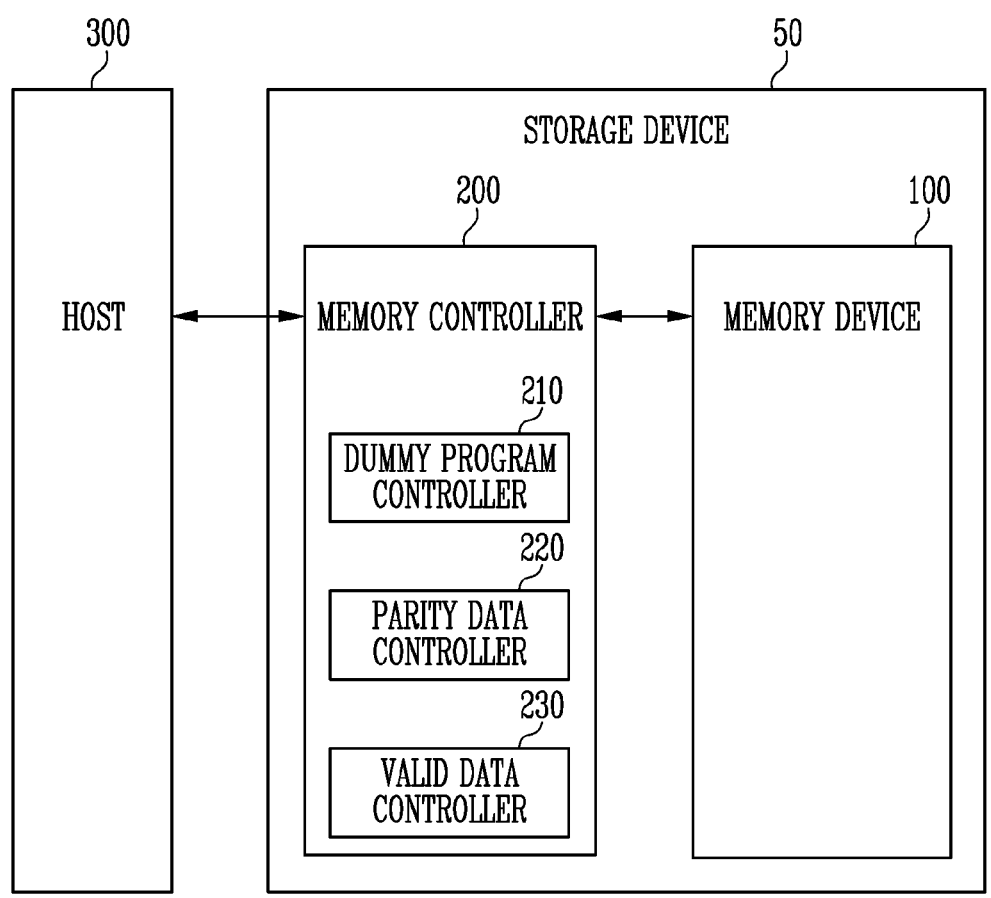
FIG. 1 is a block diagram of a storage device.

FIG. 1 is a block diagram illustrating a storage device 50.

The storage device 50 may include memory devices 100 and a memory controller 200.

The storage device 50 may be a device which stores data under the control of a host 300, such as a mobile phone, a smartphone, an MP3 player, a laptop computer, a desktop computer, a game console, a television (TV), a tablet PC, or an in-vehicle infotainment system.

The storage device 50 may be manufactured as any one of various types of storage devices depending on a host interface used for communication with the host 300. For example, the storage device 50 may be implemented as any one of a solid state disk (SSD), a multimedia card (MMC) such as an MMC, an embedded MMC (eMMC), a reduced size MMC (RS-MMC), or a micro-MMC, a secure digital (SD) card such as an SD card, a mini-SD card, or a micro-SD card, a universal serial bus (USB) storage device, a universal flash storage (UFS) device, a personal computer memory card international association (PCMCIA) card-type storage device, a peripheral component interconnection (PCI)-card type storage device, a PCI express (PCI-E) card-type storage device, a compact flash (CF) card, a smart media card, and a memory stick.

The storage device 50 may be manufactured in any one of various types of package forms. For example, the storage device 50 may be manufactured in any one of a package on package (POP), system in package (SIP), system on chip (SOC), multi-chip package (MCP), chip on board (COB), wafer-level fabricated package (WFP), and wafer-level stack package (WSP).

The memory device 100 may store data. The memory device 100 is operated in response to the control of the memory controller 200. The memory device 100 may include a memory cell array including a plurality of memory cells which store data. The memory cell array may include a plurality of memory blocks. Each memory block may include a plurality of memory cells, which may constitute a plurality of pages. In an embodiment, a page may be a unit by which data is stored in the memory device 100 or by which data stored in the memory device 100 is read. A memory block may be a unit by which data is erased.

In an embodiment, the memory device 100 may take many alternative forms, such as a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus dynamic random access memory (RDRAM), a NAND flash memory, a vertical NAND flash memory, a NOR flash memory device, a resistive RAM (RRAM), a phase-change random access memory (PRAM), a magnetoresistive RAM (MRAM), a ferroelectric RAM (FRAM), or a spin transfer torque RAM (STT-RAM). In the present specification, for convenience of description, a description will be made on the assumption that the memory device 100 is a NAND flash memory.

The memory device 100 may be implemented in a two-dimensional (2D) array structure or a three-dimensional (3D) array structure. Hereinafter, although a 2D array structure is described as an embodiment, the present disclosure is not limited to the 2D array structure. The present disclosure may also be applied not only to a flash memory device in which a charge storage layer is formed of a conductive floating gate (FG), but also to a charge trap flash (CTF) memory device in which a charge storage layer is formed of an insulating layer.

In an embodiment, the memory device 100 may be operated in a single-level cell (SLC) manner in which one data bit is stored in one memory cell. Alternatively, the memory device 100 may be operated in a manner in which at least two data bits are stored in one memory cell. For example, the memory device 100 may be operated in a multi-level cell (MLC) manner in which two data bits are stored in one memory cell, a triple-level cell (TLC) manner in which three data bits are stored in one memory cell, or a quadruple-level cell (QLC) manner in which four data bits are stored in one memory cell.

The memory device 100 may receive a command and an address from the memory controller 200, and may access the area of the memory cell array selected by the address. That is, the memory device 100 may perform an operation corresponding to the command on the area selected by the address. For example, the memory device 100 may perform a write operation (i.e., program operation), a read operation, or an erase operation in response to the received command. When a program command is received, the memory device 100 may program data to the area selected by the address. When a read command is received, the memory device 100 may read data from the area selected by the address. When an erase command is received, the memory device 100 may erase data stored in the area selected by the address.

The memory controller 200 may control the overall operation of the storage device 50.

When a supply voltage is applied to the storage device 50, the memory controller 200 may run firmware. When the memory device 100 is a flash memory device, the memory controller 200 may run firmware such as a Flash Translation Layer (FTL) for controlling communication between the host 300 and the memory device 100.

In an embodiment, the memory controller 200 may include firmware (not illustrated) which may receive data and a logical block address (LBA) from the host 300, and may translate the logical block address (LBA) into a physical block address (PBA) indicating the address of memory cells which are included in the memory device 100 and in which data is to be stored. Further, the memory controller 200 may store a logical-physical address mapping table, which indicates mapping relationships between logical block addresses (LBA) and physical block addresses (PBA), in a buffer memory.

The memory controller 200 may control the memory device 100 so that a program operation, a read operation or an erase operation is performed in response to a request received from the host 300. For example, when a program request is received from the host 300, the memory controller 200 may convert the program request into a program command, and may provide the program command, a physical block address (PBA), and data to the memory device 100. When a read request together with a logical block address is received from the host 300, the memory controller 200 may convert the read request into a read command, select a physical block address corresponding to the logical block address, and thereafter provide the read command and the physical block address (PBA) to the memory device 100. When an erase request together with a logical block address is received from the host 300, the memory controller 200 may convert the erase request into an erase command, select a physical block address corresponding to the logical block address, and thereafter provide the erase command and the physical block address (PBA) to the memory device 100.

In an embodiment, the memory controller 200 may autonomously generate a program command, an address, and data without receiving a request from the host 300, and may transmit them to the memory device 100. For example, the memory controller 200 may provide commands, addresses, and data to the memory device 100 so as to perform background operations, such as a program operation for wear leveling and a program operation for garbage collection.

In an embodiment, a sudden power-off (SPO) in which the power of the memory device 100 is instantaneously turned off during an operation may occur. When power is turned on again after the occurrence of an SPO, an SPO recovery operation may be performed. When the SPO occurs during a program operation of the memory device 100, that program operation may not complete properly, which may result in incorrect data being programmed into the memory device. To cope with this possibility, the SPO recovery operation may program the correct data again, but into a newly allocated memory block other than the memory block in which the SPO has occurred. In this document, 'a page in which an SPO has occurred' refers to a page in which a program operation was being performed when the SPO occurred, and 'a chipkill group in which an SPO has occurred' refers to a chipkill group that includes a page in which an SPO has occurred.

However, when an SPO frequently occurs, the use of memory blocks may increase due to the SPO recovery operation described above, and the lifespan of the memory device 100 may decrease due to the increase in the use of memory blocks. For example, for the use of newly allocated memory blocks in the SPO recovery operation, the number of unprogrammed pages included in the chipkill group in which the SPO has occurred may be increased. Furthermore, the use of newly allocated memory blocks in the SPO recovery operation may increase the number of block erasures that need to be performed, thus decreasing the lifespan of the memory device 100. Therefore, there is presented herein a process that increases the lifespan of the memory device 100 by moving data in the memory block in which the SPO has occurred to another page, that is, by performing continuous data writing.

In an embodiment, in the event of an SPO, valid data in a chipkill group in which the SPO has occurred may be moved to another page by means of an SPO recovery operation. Here, the chipkill group may be a unit by which parity data for chipkill decoding is generated, and chipkill decoding may be a correction operation performed after an error correction decoding operation has failed. The parity data may be data corresponding to the chipkill group, and may be generated and programmed on a specific unit basis.

Each chipkill group may include pages at the same positions (that is, having a same address offset) in respective memory blocks. For example, a first chipkill group may include 1_1-th to 5_1-th pages of a first memory block, and 1_2-th to 5_2-th pages of a second memory block, 1_3-th to 5_3-th pages of a third memory block, and 1_4-th to 5_4-th pages of a fourth memory block, which are pages at the same positions as the 1_1-th to 5_1-th pages. Therefore, the first chipkill group may include 20 pages.

In an embodiment, before valid data is moved to another page, a dummy program operation may be performed in the chipkill group in which the SPO has occurred. Here, the number of pages on which the dummy program operation is performed may vary. For example, only one page may be dummy-programmed for each memory block that has pages in the chipkill group, or alternatively, two or more pages may be dummy-programmed for each memory block. A dummy programming operation may include performing programming operations to a page using random, pseudo-random, or a predetermined value. A dummy programming operations may take less time than an ordinary programming operation; for example, in a page storing more than one bit in each cell, the dummy programming operation may program only one bit in each cell.

In an embodiment, when the dummy program operation is completed, valid data in the chipkill group in which the SPO has occurred may be moved to another page, and a suspended program operation may be resumed. Here, parity data may be generated depending on the size of the chipkill group.

In an embodiment, the memory controller 200 may include a dummy program controller 210. The dummy program controller 210 may control the dummy program operation that is performed before the valid data in the chipkill group in which the SPO has occurred is moved to another page. The dummy program controller 210 may control the memory device 100 so that the dummy program operation is performed on pages determined depending on the position of the page in which the SPO has occurred.

In an example, the dummy program controller 210 may control the memory device 100 so that the dummy program operation is performed on the remaining (that is, currently unprogrammed) pages of the chipkill group in which the SPO has occurred. In other examples, the dummy program controller 210 may control the memory device 100 so that the dummy program operation is performed on some pages of the chipkill group in which the SPO has occurred.

In an embodiment, the memory controller 200 may include a parity data controller 220. Parity data for a chipkill group may be generated, for example, by resetting a parity register to an initial value (such as zero) and then updating the parity register according to the respective data subsequently programmed into the pages of the chipkill group as those pages are programmed, and then programming the final value of the parity register into a parity page of the chipkill group when the programming of data into the other pages of the chipkill group is complete. The parity data controller 220 may control the resetting of parity data based on the dummy program operation performed after the occurrence of the SPO. For example, when the dummy program controller 210 controls the memory device 100 so that the dummy program operation is performed on the remaining pages of the chipkill group, the parity data controller 220 may not reset the parity data for the chipkill group, whereas when the dummy program controller 210 controls the memory device 100 so that the dummy program operation is performed on some but not all of the remaining pages of the chipkill group, the parity data controller 220 may reset the parity data.

In an embodiment, the memory controller 200 may include a valid data controller 230. The valid data controller 230 may control the memory device 100 so that, after the dummy program operation has been completed, valid data, programmed before the occurrence of the SPO, is moved. The valid data may be programmed to pages in the chipkill group in which the SPO has occurred, or to pages in another chipkill group.

In an embodiment, the storage device 50 may include a buffer memory (not illustrated). The memory controller 200 may control data exchange between the host 300 and the buffer memory (not illustrated). Alternatively, the memory controller 200 may temporarily store system data for controlling the memory device 100 in the buffer memory. For example, the memory controller 200 may temporarily store data input from the host 300 in the buffer memory, and may then transmit the data, temporarily stored in the buffer memory to the memory device 100.

In various embodiments, the buffer memory may be used as a working memory or a cache memory for the memory controller 200. The buffer memory may store codes or commands that are executed by the memory controller 200. Alternatively, the buffer memory may store data that is processed by the memory controller 200.

In an embodiment, the buffer memory may be implemented as a DRAM such as a double data rate SDRAM (DDR SDRAM), a double data rate fourth generation (DDR4) SDRAM, a low power double data rate fourth generation (LPDDR4) SDRAM, a graphics double data rate (GDDR) SDRAM, a low power DDR (LPDDR) SDRAM, or a Rambus DRAM (RDRAM), or as a static RAM (SRAM).

In various embodiments, the buffer memory may be coupled to the storage device 50 from outside the storage device 50. In this case, volatile memory devices coupled to the outside of the storage device 50 may function as the buffer memory.

In an embodiment, the memory controller 200 may control at least two memory devices 100. In this case, the memory controller 200 may control the at least two memory devices 100 using an interleaving scheme to improve operating performance.

The host 300 may communicate with the storage device 50 using at least one of various communication technologies, such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication technologies.

Figure 2:
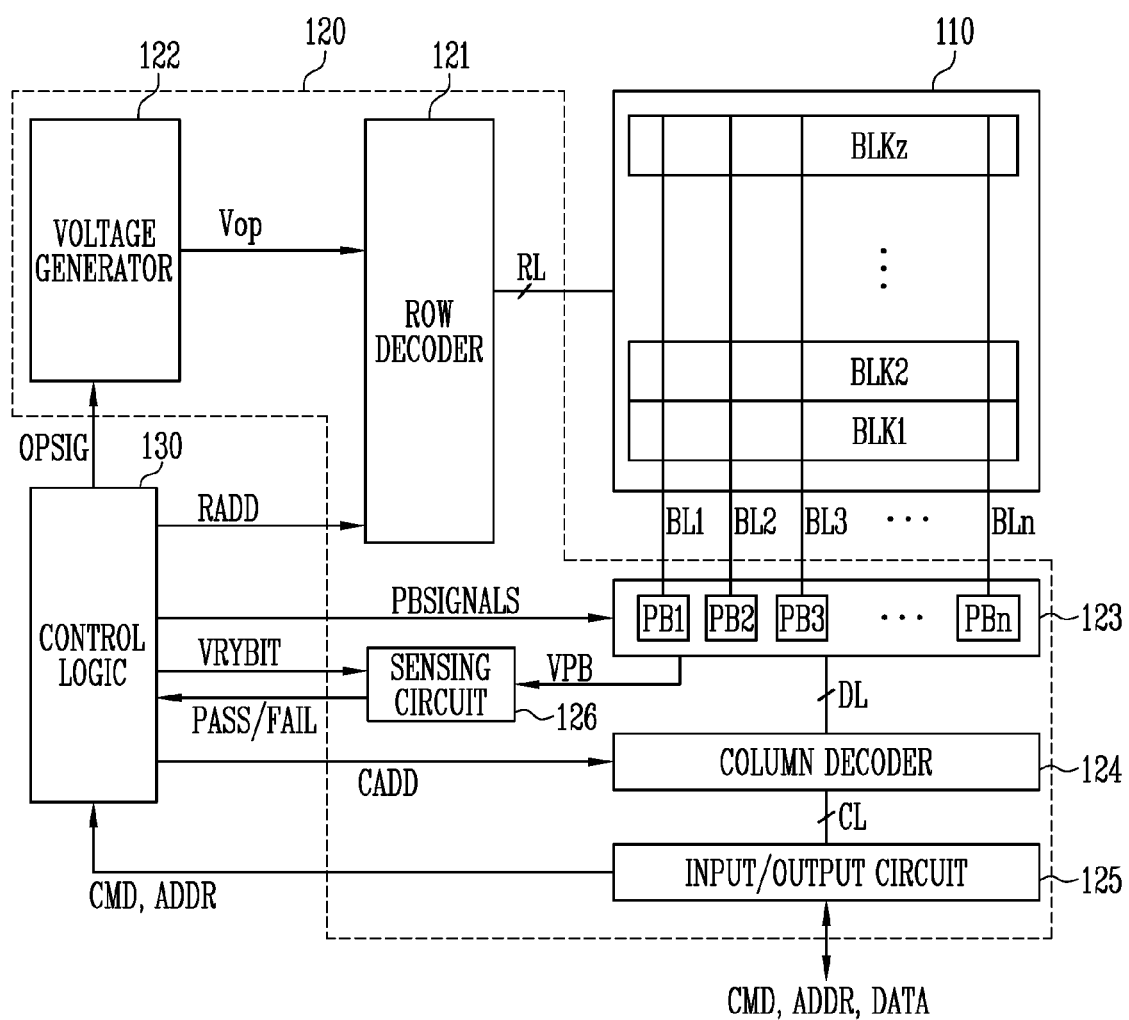
FIG. 2 illustrates the structure of a memory device of FIG. 1.

FIG. 2 is a diagram illustrating the structure of the memory device of FIG. 1.

Referring to FIG. 2, the memory device 100 may include a memory cell array 110, a peripheral circuit 120, and control logic 130.

The memory cell array 110 includes a plurality of memory blocks BLK1 to BLKz. The plurality of memory blocks BLK1 to BLKz are coupled to a row decoder 121 through row lines RL. Each of the memory blocks BLK1 to BLKz may be coupled to a page buffer group 123 through bit lines BL1 to BLn. Each of the memory blocks BLK1 to BLKz may include a plurality of memory cells. In an embodiment, the plurality of memory cells may be nonvolatile memory cells. Memory cells coupled to the same word line may be defined as a single page. Therefore, a single memory block may include a plurality of pages.

The row lines RL may include at least one source select line, a plurality of word lines, and at least one drain select line.

Each of the memory cells included in the memory cell array 110 may be implemented as a single-level cell (SLC) capable of storing one data bit, a multi-level cell (MLC) capable of storing two data bits, a triple-level cell (TLC) capable of storing three data bits, or a quadruple-level cell (QLC) capable of storing four data bits.

The peripheral circuit 120 may perform a program operation, a read operation, or an erase operation on a selected area of the memory cell array 110 under the control of the control logic 130. The peripheral circuit 120 may drive the memory cell array 110. For example, the peripheral circuit 120 may apply various operating voltages to the row lines RL and the bit lines BL1 to BLn or discharge the applied voltages under the control of the control logic 130.

The peripheral circuit 120 may include the row decoder 121, a voltage generator 122, the page buffer group 123, a column decoder 124, an input/output circuit 125, and a sensing circuit 126.

The row decoder 121 is coupled to the memory cell array 110 through the row lines RL. The row lines RL may include the at least one source select line, the plurality of word lines, and the at least one drain select line. In an embodiment, the word lines may include normal word lines and dummy word lines. In an embodiment, the row lines RL may further include a pipe select line.

The row decoder 121 may decode a row address RADD received from the control logic 130. The row decoder 121 selects at least one of the memory blocks BLK1 to BLKz according to the decoded address. Further, the row decoder 121 may select at least one word line WL of the selected memory block so that voltages generated by the voltage generator 122 are applied to the at least one word line WL according to the decoded address.

For example, during a program operation, the row decoder 121 may apply a program voltage to a selected word line and apply a program pass voltage having a level lower than that of the program voltage to unselected word lines. During a program verify operation, the row decoder 121 may apply a verify voltage to a selected word line and apply a verify pass voltage higher than the verify voltage to unselected word lines. During a read operation, the row decoder 121 may apply a read voltage to a selected word line and apply a read pass voltage higher than the read voltage to unselected word lines.

In an embodiment, the erase operation of the memory device 100 is performed on a memory block basis. During an erase operation, the row decoder 121 may select one memory block according to the decoded address. During the erase operation, the row decoder 121 may apply a ground voltage to word lines coupled to the selected memory block.

The voltage generator 122 may be operated under the control of the control logic 130. The voltage generator 122 may generate a plurality of voltages using an external supply voltage provided to the memory device 100. In detail, the voltage generator 122 may generate various operating voltages Vop that are used for program, read, and erase operations in response to an operation signal OPSIG. For example, the voltage generator 122 may generate a program voltage, a verify voltage, a pass voltages, a read voltage, an erase voltage, etc. under the control of the control logic 130.

In an embodiment, the voltage generator 122 may generate an internal supply voltage by regulating the external supply voltage. The internal supply voltage generated by the voltage generator 122 is used as an operating voltage for the memory device 100.

In an embodiment, the voltage generator 122 may generate a plurality of voltages using the external supply voltage or the internal supply voltage.

For example, the voltage generator 122 may include a plurality of pumping capacitors for receiving the internal supply voltage and generate a plurality of voltages by selectively enabling the plurality of pumping capacitors under the control of the control logic 130.

The generated voltages may be supplied to the memory cell array 110 by the row decoder 121.

The page buffer group 123 includes first to nth page buffers PB1 to PBn. The first to nth page buffers PB1 to PBn are coupled to the memory cell array 110 through the first to nth bit lines BL1 to BLn. The first to nth page buffers PB1 to PBn are operated under the control of the control logic 130. In detail, the first to nth page buffers PB1 to PBn may be operated in response to page buffer control signals PBSIGNALS. For example, the first to nth page buffers PB1 to PBn may temporarily store data received through the first to nth bit lines BL1 to BLn or may sense voltages or currents of the bit lines BL1 to BLn during a read or verify operation.

In detail, during a program operation, when the program voltage is applied to the selected word line, the first to nth page buffers PB1 to PBn may transfer the data DATA, received through the input/output circuit 125, to selected memory cells through the first to nth bit lines BL1 to BLn. The memory cells in the selected page are programmed based on the received data DATA. During a program verify operation, the first to nth page buffers PB1 to PBn may read page data by sensing the voltages or currents received through the first to nth bit lines BL1 to BLn from the selected memory cells.

During a read operation, the first to nth page buffers PB1 to PBn may read data DATA from the memory cells in the selected page through the first to nth bit lines BL1 to BLn, and may output the read data DATA to the input/output circuit 125 under the control of the column decoder 124.

During the erase operation, the first to nth page buffers PB1 to PBn may allow the first to nth bit lines BL1 to BLn to float or may apply the erase voltage to the first to nth bit lines BL1 to BLn.

The column decoder 124 may transfer data between the input/output circuit 125 and the page buffer group 123 in response to a column address CADD. For example, the column decoder 124 may exchange data with the first to nth page buffers PB1 to PBn through data lines DL or may exchange data with the input/output circuit 125 through column lines CL.

The input/output circuit 125 may transfer a command CMD and an address ADDR, received from the memory controller (e.g., memory controller 200 of FIG. 1) described above with reference to FIG. 1, to the control logic 130, or may exchange data DATA with the column decoder 124.

During a read operation or a verify operation, the sensing circuit 126 may generate a reference current in response to an enable bit VRYBIT, and may compare a sensing voltage VPB received from the page buffer group 123 with a reference voltage generated by the reference current and then output a pass signal PASS or a fail signal FAIL.

The control logic 130 may control the peripheral circuit 120 by outputting the operation signal OPSIG, the row address RADD, the page buffer control signals PBSIGNALS, and the enable bit VRYBIT in response to the command CMD and the address ADDR. For example, the control logic 130 may control a read operation on a selected memory block in response to a sub-block read command and an address. Also, the control logic 130 may control an erase operation on a selected sub-block included in a selected memory block in response to a sub-block erase command and an address. In addition, the control logic 130 may determine whether a verify operation has passed or failed in response to the pass or fail signal PASS or FAIL.

Figure 3:
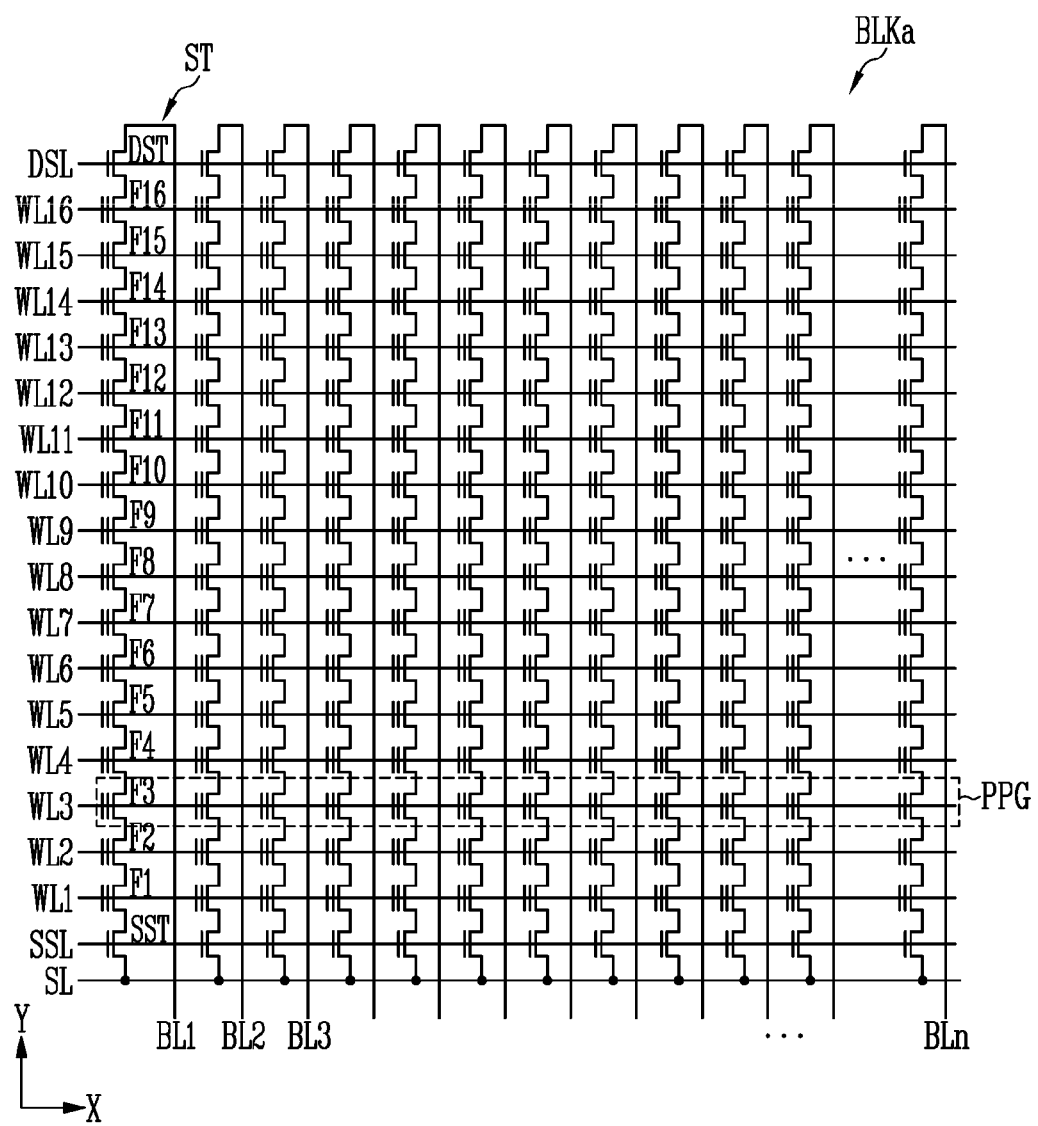
FIG. 3 illustrates an embodiment of a memory cell array of FIG. 2.

FIG. 3 is a diagram illustrating an embodiment of the memory cell array of FIG. 2.

Referring to FIGS. 2 and 3, FIG. 3 is a circuit diagram illustrating any one memory block BLKa of a plurality of memory blocks BLK1 to BLKz included in the memory cell array 110 of FIG. 2.

The memory block BLKa may be coupled to a first select line, word lines, and a second select line that are coupled in parallel to each other. For example, the word lines may be coupled in parallel to each other between the first and second select lines. Here, the first select line may be a source select line SSL, and the second select line may be a drain select line DSL.

In detail, the memory block BLKa may include a plurality of strings coupled between bit lines BL1 to BLn and a source line SL. The bit lines BL1 to BLn may be coupled to the strings, respectively, and the source line SL may be coupled in common to the strings. Because the strings may be identically configured, a string ST coupled to the first bit line BL1 will be described in detail by way of example.

The string ST may include a source select transistor SST, a plurality of memory cells F1 to F16, and a drain select transistor DST which are coupled in series to each other between the source line SL and the first bit line BL1. A single string ST may include at least one source select transistor SST and at least one drain select transistor DST, and more memory cells than the memory cells F1 to F16 illustrated in the drawing may be included in the string ST.

A source of the source select transistor SST may be coupled to the source line SL, and a drain of the drain select transistor DST may be coupled to the first bit line BL1. The memory cells F1 to F16 may be coupled in series between the source select transistor SST and the drain select transistor DST. Gates of the source select transistors included in different strings ST may be coupled to the source select line SSL, gates of the drain select transistors included in different strings ST may be coupled to the drain select line DSL, and gates of the memory cells F1 to F16 may be coupled to a plurality of word lines WL1 to WL16, respectively. A group of memory cells coupled to the same word line, among the memory cells included in different strings ST, may be referred to as a "physical page: PPG". Therefore, the memory block BLKa may include a number of physical pages PPG identical to the number of word lines WL1 to WL16.

One memory cell may store one bit of data. This cell is typically designated as a "single-level cell: SLC". In the SLC case, one physical page PPG may store data corresponding to one logical page LPG. The data corresponding to one logical page LPG may include a number of data bits identical to the number of memory cells included in one physical page PPG. Alternatively, one memory cell may store two or more bits of data. This cell is typically designated as a "multi-level cell: MLC". In the MLC case, one physical page PPG may store data corresponding to two or more logical pages LPG.

A memory cell in which two or more bits of data are stored in one memory cell is called a multi-level cell (MLC). However, recently, as the number of data bits stored in one memory cell increases, the multi-level cell (MLC) refers to a memory cell in which two bits of data are stored, and thus a memory cell in which three bits of data are stored is called a triple-level cell (TLC) and a memory cell in which four bits of data are stored is called a quadruple-level cell (QLC). In addition, a memory cell scheme in which multiple bits of data are stored has been developed, and the present embodiment may be applied to the memory device 100 in which two or more bits of data are stored in one memory cell.

In an embodiment, each of the memory blocks may have a three-dimensional (3D) structure. Each of the memory blocks may include a plurality of memory cells stacked on a substrate. The plurality of memory cells may be arranged in +X, +Y, and +Z directions.

FIG. 4 is a diagram for explaining the generation and programming of parity data.

Referring to FIGS. 2 and 4, FIG. 4 illustrates first to fourth memory blocks BLK1 to BLK4, among a plurality of memory blocks BLK1 to BLKz included in the memory cell array of FIG. 2 (e.g., the memory cell array 110 of FIG. 2).

In an embodiment, the first memory block BLK1 may include 1_1-th to 15_1-th pages PAGE1_1 to PAGE15_1, the second memory block BLK2 may include 1_2-th to 15_2-th pages PAGE1_2 to PAGE15_2, the third memory block BLK3 may include 1_3-th to 15_3-th pages PAGE1_3 to PAGE15_3, and the fourth memory block BLK4 may include 1_4-th to 15_4-th pages PAGE1_4 to PAGE15_4.

In the present drawing, although each memory block is illustrated as being composed of 15 pages, each memory block may be composed of fewer pages or more pages in other embodiments.

In an embodiment, the memory device (e.g., the memory device 100 of FIG. 2) may program parity data. The parity data may be data that is programmed to recover failed data after an error correction decoding operation has failed.

The parity data may be generated by performing an exclusive OR (XOR) operation on data in a specific area, and may be programmed to a specific position in a specific memory block. Here, the specific area may be a chipkill group, and may be an area corresponding to 20 pages. Also, the parity data may be programmed to the last page of the fourth memory block BLK4, among pages in the chipkill group. The number of pages corresponding to each chipkill group and a position to which the parity data is to be programmed may be variously set.

The chipkill group may include pages at the same positions in respective memory blocks. For example, a first chipkill group CK_GROUP1 may include 1_1-th to 5_1-th pages PAGE1_1 to PAGE5_1 of the first memory block BLK1, and 1_2-th to 5_2-th pages PAGE1_2 to PAGE5_2 of the second memory block BLK2, 1_3-th to 5_3-th pages PAGE1_3 to PAGE5_3 of the third memory block BLK3, and 1_4-th to 5_4-th pages PAGE1_4 to PAGE5_4 of the fourth memory block BLK4, which are pages at the same positions as the 1_1-th to 5_1-th pages PAGE1_1 to PAGE5_1. Therefore, the number of pages included in the first chipkill group CK_GROUP1 may be 20.

Similarly, a second chipkill group CK_GROUP2 may include 6_1-th to 10_1-th pages PAGE6_1 to PAGE10_1 of the first memory block BLK1, 6_2-th to 10_2-th pages PAGE6_2 to PAGE10_2 of the second memory block BLK2, 6_3-th to 10_3-th pages PAGE6_3 to PAGE10_3 of the third memory block BLK3, and 6_4-th to 10_4-th pages PAGE6_4 to PAGE10_4 of the fourth memory block BLK4, and the number of pages included in the second chipkill group CK_GROUP2 may be 20.

Similarly, a third chipkill group CK_GROUP3 may include 11_1-th to 15_1-th pages PAGE11_1 to PAGE15_1 of the first memory block BLK1, 11_2-th to 15_2-th pages PAGE11_2 to PAGE15_2 of the second memory block BLK2, 11_3-th to 15_3-th pages PAGE11_3 to PAGE15_3 of the third memory block BLK3, and 11_4-th to 15_4-th pages PAGE11_4 to PAGE15_4 of the fourth memory block BLK4, and the number of pages included in the third chipkill group CK_GROUP3 may be 20.

Therefore, during a program operation performed on the pages in the first chipkill group CK_GROUP1, the memory controller (e.g., memory controller 200 of FIG. 1) may generate parity data by performing an exclusive OR (XOR) operation on all pieces of data in the pages of the first chipkill group CK_GROUP1 except for the 5_4-th page PAGE5_4, and may program the generated parity data to the 5_4-th page PAGE5_4 of the fourth memory block BLK4.

Thereafter, when any one of the pages in the first chipkill group CK_GROUP1 is read, but error correction on the read page fails, the memory controller may recover data that failed in error correction by performing an XOR operation on pieces of data read from the remaining pages in the first chipkill group CK_GROUP1.

As in the case of the first chipkill group CK_GROUP1, during a program operation performed on the pages in the second chipkill group CK_GROUP2, the memory controller (e.g., memory controller 200 of FIG. 1) may generate parity data by performing an exclusive OR (XOR) operation on pieces of data in the pages of second chipkill group CK_GROUP2 except for the 10_4-th page PAGE10_4, and may program the generated parity data to the 10_4-th page PAGE10_4 of the fourth memory block BLK4. Also, during a program operation performed on the pages in the third chipkill group CK_GROUP3, the memory controller may generate parity data by performing an XOR operation on pieces of data in the pages of the third chipkill group CK_GROUP3 except for the 15_4-th page PAGE15_4, and may program the generated parity data to the 15_4-th page PAGE15_4 of the fourth memory block BLK4.

Thereafter, when any one of the pages in the second chipkill group CK_GROUP2 is read, but error correction on the read page fails, the memory controller (e.g., memory controller 200 of FIG. 1) may recover data that failed in error correction by performing an XOR operation on pieces of data read from the remaining pages in the second chipkill group CK_GROUP2. Thereafter, when any one of the pages in the third chipkill group CK_GROUP3 is read, but error correction on the read page fails, the memory controller may recover data failed in error correction by performing an XOR operation on pieces of data read from the remaining pages in the third chipkill group CK_GROUP3.

Figure 5:
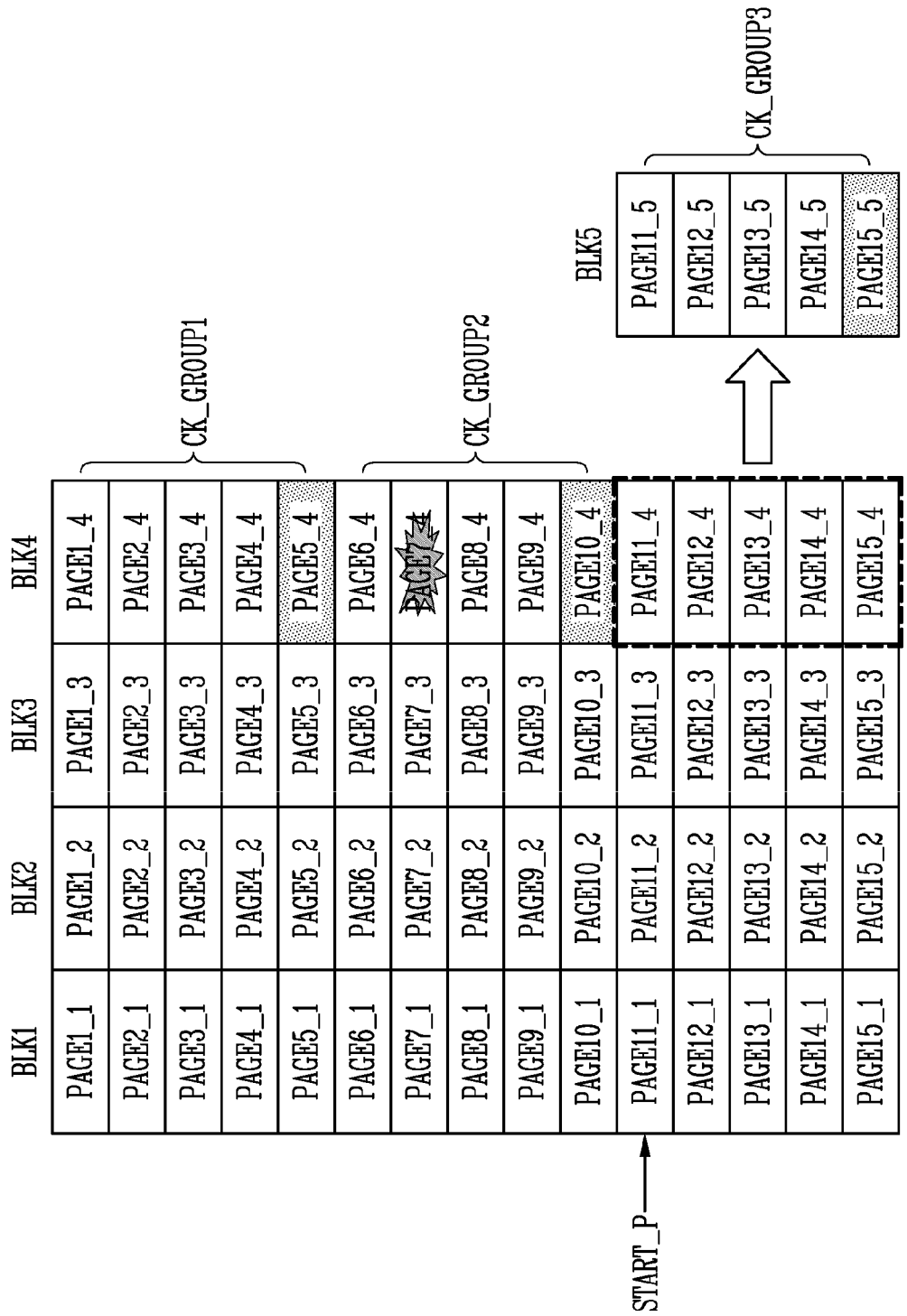
FIG. 5 illustrates a recovery process based on a recovery operation performed after the occurrence of a sudden power-off.

FIG. 5 is a diagram illustrating a recovery process based on a recovery operation performed after the occurrence of a sudden power-off.

Referring to FIGS. 4 and 5, FIG. 5 illustrates the first to fourth memory blocks BLK1 to BLK4 of FIG. 4. Unlike in FIG. 4, the memory cell array of FIG. 5 further includes a fifth memory block BLK5, which may be a free block (that is, a memory block in which no pages have been programmed since the memory block was last erased).

In FIG. 5, descriptions of components that are substantially identical to those of FIG. 4 will be omitted.

In an embodiment, an SPO may occur while the memory device (e.g., memory device 100 of FIG. 2) is in the process of performing a program operation. For example, an SPO may occur while the memory device performs a program operation on the 7_4-th page PAGE7_4 of the fourth memory block BLK4.

When power is turned on again after the occurrence of an SPO, an SPO recovery operation may be performed. In the SPO recovery operation of FIG. 5, because the SPO has occurred while the program operation was being performed on any one of the pages included in the fourth memory block BLK4, the fourth memory block BLK4 is processed as a bad block, and data to be programmed to the fourth memory block BLK4 may be programmed to another free block other than the fourth memory block BLK4. For example, the data that was to be programmed to the fourth memory block BLK4 may be programmed to the fifth memory block BLK5 which is a free block.

Further, during an SPO recovery operation, in order to maintain the unit of a chipkill group (so that the chipkill group includes the same number of pages), a program operation may not be performed on pages in the second chipkill group CK_GROUP2 that included the 7_4-th page PAGE7_4 in which the SPO has occurred, and may be performed (again, for data previously programmed into the second chipkill group CK_GROUP2) on pages starting with the 11_1-th page PAGE11_1 in the third chipkill group CK_GROUP3. Here, the memory device (e.g., memory device 100 of FIG. 2) may initiate the generation of parity data while programming the data that was originally programmed to the 6_1-th page PAGE6_1 into the 11_1-th PAGE11_1 (START_P).

Because the fourth memory block BLK4 is treated as a bad block, the data that, prior to the SPO, would have been programmed to the fourth memory block BLK4 is instead programmed to the fifth memory block BLK5, and the pages of the fourth memory block BLK4 may be excluded from the third chipkill group CK_GROUP3. Further, the 11_5-th to 15_5-th pages PAGE11_5 to PAGE15_5 of the fifth memory block BLK5 may be included in the third chipkill group CK_GROUP3.

Furthermore, parity data corresponding to third chipkill group CK_GROUP3, that is, data generated by performing an XOR operation on the pieces of data in the pages of the third chipkill group CK_GROUP3 except for the 15_5-th page PAGE15_5, may be programmed to the 15_5-th page PAGE15_5.

However, as described above, treating the fourth memory block BLK4 as a bad block and programming the data that would have been programmed into the fourth memory block BLK4 into the fifth memory block BLK5, that is, based on the allocation of a new memory block, is problematic in that the consumption of memory blocks is accelerated, and thus a wear acceleration index (WAI) or a write amplification factor (WAF) increases.

Therefore, in order to decrease the wear acceleration index (WAI) or the write amplification factor (WAF), a process of performing continuous writing is presented in the present disclosure. Here, for a continuous write operation, codes related to chipkill may be modified.

Figure 6:
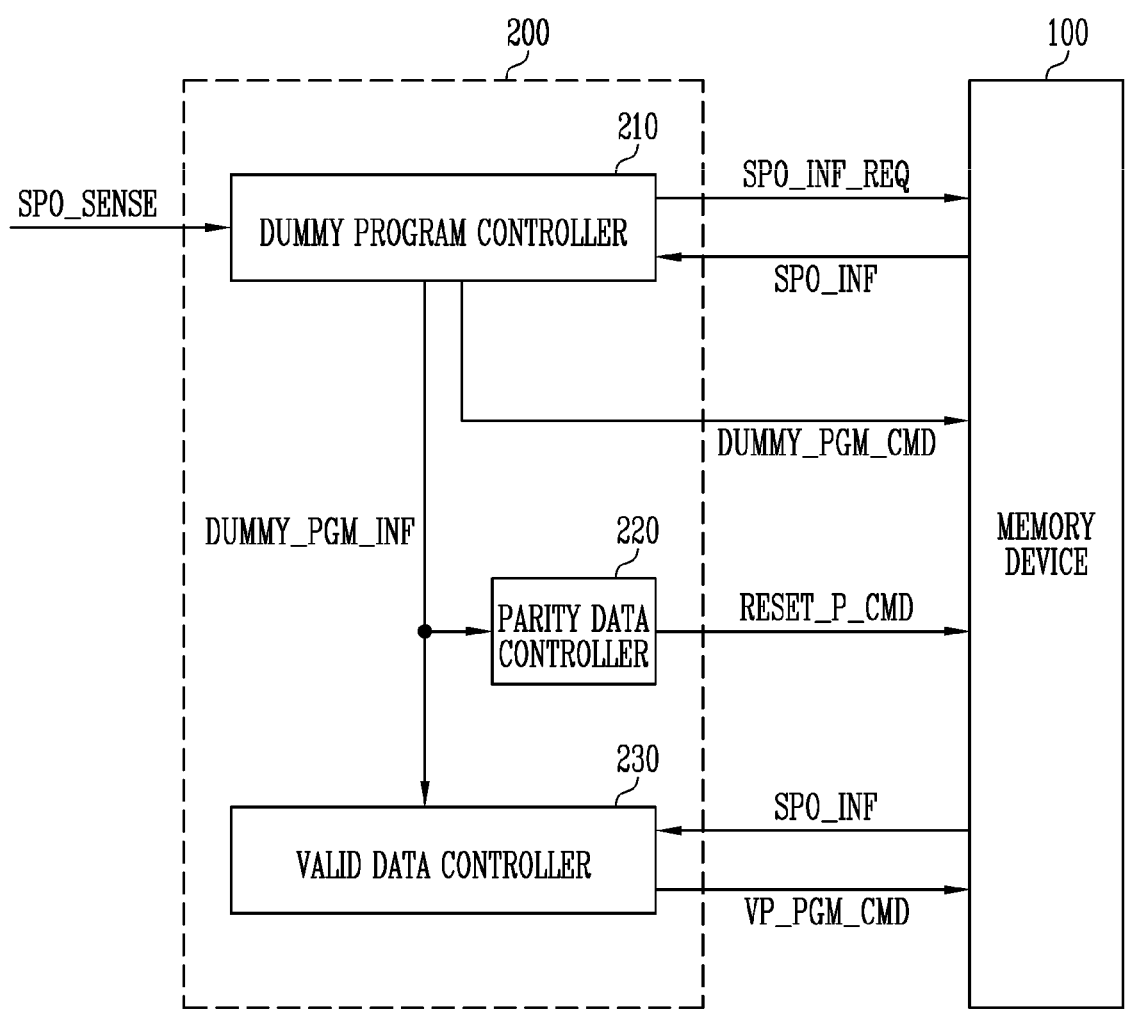
FIG. 6 illustrates a procedure for programming parity data while maintaining a chipkill group unit.

FIG. 6 illustrates a process for programming parity data while maintaining a chipkill group unit.

Referring to FIG. 6, the memory controller 200 may include a dummy program controller 210, a parity data controller 220, and a valid data controller 230.

In an embodiment, an SPO may occur while the memory device 100 is performing a program operation. When power is turned on again after the occurrence of the SPO, an SPO recovery operation may be performed.

The SPO recovery operation may be performed without allocation of a new memory block. For example, the recovery operation may be performed through a continuous write operation from a page subsequent to the page in which the SPO has occurred. In this case, the continuous write operation may include a dummy program operation.

When the SPO recovery operation is performed, the dummy program controller 210 may receive an SPO sensing signal SPO_SENSE from the inside or outside of the memory controller 200. The dummy program controller 210 may perform operations for SPO recovery based on the received SPO sensing signal SPO_SENSE.

In an embodiment, in order to perform a recovery operation without allocation of a new memory block, the dummy program controller 210 may output an SPO information request SPO_INF_REQ to the memory device 100. The SPO information request SPO_INF_REQ may be a request for information about the page in which the SPO has occurred. The memory device 100 may output SPO information SPO_INF, including the information about the page in which the SPO has occurred, to the dummy program controller 210 and to the valid data controller 230 in response to the SPO information request SPO_INF_REQ.

The dummy program controller 210 may identify the page in which the SPO has occurred based on the SPO information SPO_INF. The dummy program controller 210 may control the memory device 100 so that a dummy program operation is performed on pages subsequent to the page in which the SPO has occurred. For example, the dummy program controller 210 may output a dummy program command DUMMY_PGM_CMD to the memory device 100, and the memory device 100 may perform the dummy program operation on the pages subsequent to the page in which the SPO has occurred in response to the dummy program command DUMMY_PGM_CMD.

Here, the dummy program controller 210 may determine pages on which the dummy program operation is to be performed, and may output the dummy program command DUMMY_PGM_CMD for instructing the dummy program operation to be performed on the determined pages. The pages on which the dummy program operation is to be performed may be determined based on the number of successfully programmed pages among the pages included in a chipkill group. The chipkill group may be a unit by which parity data for chipkill decoding is generated, and chipkill decoding may be a correction operation performed after an error correction decoding operation (such as an ECC operation for a page in the chipkill group) has failed.

When the number of successfully programmed pages, among the pages included in the chipkill group, is less than or equal to a reference number, the dummy program controller 210 may control the memory device 100 so that only one page in each memory block in the chipkill group, among the pages subsequent to the page in which the SPO has occurred, is dummy-programmed.

However, when the number of successfully programmed pages among the pages included in the chipkill group is greater than the reference number, the dummy program controller 210 may control the memory device 100 so that all pages in the chipkill group subsequent to the page in which the SPO has occurred are dummy-programmed. That is, the dummy program controller 210 may control the memory device 100 so that all pages in an erased state in the chipkill group are dummy-programmed.

In an embodiment, the dummy program controller 210 may output dummy program information DUMMY_PGM_INF, which is information about the pages on which the dummy program operation is to be performed, to the parity data controller 220 and the valid data controller 230.

In an embodiment, the parity data controller 220 may control the initiation or resetting of generation of parity data based on the dummy program information DUMMY_PGM_INF. The parity data may be parity data for chipkill decoding.

When the dummy program controller 210 determines that only one page in each memory block, among the pages subsequent to the page in which the SPO has occurred, is to be dummy-programmed, the parity data controller 220 may control the resetting of parity data while moving valid data within the chipkill group in which the SPO has occurred. For example, the parity data controller 220 may output a parity reset command RESET_P_CMD to the memory device 100, and the memory device 100 may initiate the generation of new parity data instead of the previously generated parity data while moving the valid data.

When the dummy program controller 210 determines that all pages in the chipkill group subsequent to the page in which the SPO has occurred are to be dummy-programmed, the parity data controller 220 may not perform a separate operation for the generation or resetting of parity data.

In an embodiment, the valid data controller 230 may control the memory device 100 so that valid data is programmed based on both the SPO information SPO_INF including information about the page in which the SPO has occurred and dummy program information DUMMY_PGM_INF that is information about pages on which the dummy program operation is to be performed.

In detail, the valid data controller 230 may determine pages in which valid data is stored, among the pages in the chipkill group in which the SPO has occurred, based on the SPO information SPO_INF. Further, the valid data controller 230 may determine the pages on which the dummy program operation is to be performed in the chipkill group, based on the dummy program information DUMMY_PGM_INF.

Thereafter, when all of the pages subsequent to the page in which the SPO has occurred in the chipkill group are dummy-programmed, the valid data controller 230 may output to the memory device 100 a valid page program command VP_PGM_CMD so as to program valid data to pages in a subsequent chipkill group.

However, when it is determined that only one page in each memory block among the pages subsequent to the page in which the SPO has occurred in the chipkill group is to be dummy-programmed, the valid data controller 230 may output to the memory device 100 a valid page program command VP_PGM_CMD for programming valid data to pages starting from a page subsequent to the pages on which the dummy program operation was performed.

FIG. 7 is a diagram illustrating an embodiment in which parity data is generated while a chipkill group unit is maintained; that is, wherein the number of pages in a chipkill group is not changed.

Referring to FIGS. 4 and 7, FIG. 7 illustrates the first to fourth memory blocks BLK1 to BLK4 of FIG. 4.

In FIG. 7, descriptions of components substantially identical to those of FIG. 4 will be omitted.

In an embodiment, an SPO may occur while the memory device (e.g., the memory device 100 of FIG. 6) performs a program operation on 7_3-th and 7_4-th pages PAGE7_3 and PAGE7_4. When power is turned on again after the occurrence of the SPO, an SPO recovery operation may be performed.

Here, a new memory block to replace a memory block including a page in which the SPO has occurred may not be allocated, and the SPO recovery operation may be performed through a continuous write operation. During the continuous write operation, the unit of the chipkill group may be maintained. That is, the number of pages included in the chipkill group may be maintained at 20.

In an embodiment, before an SPO occurs in the 7_3-th and 7_4-th pages PAGE7_3 and PAGE7_4, valid data may be programmed to 6_1-th to 6_4-th pages PAGE6_1 to PAGE6_4, a 7_1-th page PAGE7_1, and a 7_2-th page PAGE7_2.

In an embodiment, SPO information SPO_INF output from the memory device (e.g., 100 of FIG. 6) may include information indicating that the SPO has occurred while the program operation was being performed on the 7_3-th and 7_4-th pages PAGE7_3 and PAGE7_4. Therefore, the dummy program controller (e.g., the dummy program controller 210 of FIG. 6) may determine whether the number of pages to which the valid data is programmed is less than or equal to a reference number based on the SPO information SPO_INF.

However, in order to maintain the unit of the chipkill group, the dummy program controller (e.g., dummy program controller 210 of FIG. 6) may control the memory device (e.g., memory device 100 of FIG. 6) so that pages subsequent to the page in which the SPO has occurred among pages in the second chipkill group CK_GROUP2 are dummy-programmed. That is, the dummy program controller (e.g., the dummy program controller 210 of FIG. 6) may determine that 8_1-th to 8_4-th pages PAGE8_1 to PAGE8_4, 9_1-th to 9_4-th pages PAGE9_1 to PAGE9_4, and 10_1-th to 10_4-th pages PAGE10_1 to PAGE10_4 in the second chipkill group CK_GROUP2 are to be dummy-programmed.

When the dummy program operation performed on the 8_1-th to 8_4-th pages PAGE8_1 to PAGE8_4, the 9_1-th to 9_4-th pages PAGE9_1 to PAGE9_4, and the 10_1-th to 10_4-th pages PAGE10_1 to PAGE10_4 has been completed, the valid data controller (e.g., the valid data controller 230 of FIG. 2 FIG. 6) may control the memory device (e.g., 100 of FIG. 6) so that data in the 6_1-th to 6_4-th pages PAGE6_1 to PAGE6_4, the 7_1-th page PAGE7_1, and the 7_2-th page PAGE7_2, that is, valid data, is moved to pages in the third chipkill group CK_GROUP3. Although FIG. 7 shows the third chipkill group CK_GROUP3 being immediately subsequent to the second chipkill group CK_GROUP2 in which the SPO has occurred, embodiments are not limited thereto, and the third chipkill group CK_GROUP3 may be any chipkill group that is not already in use (that is, in which all the pages have not been programmed since they were last erased).

For example, the valid data controller (e.g., valid data controller 230 of FIG. 6) may control the memory device (e.g., memory device 100 of FIG. 6) so that data in the 6_1-th page PAGE6_1 is moved to the 11_1-th page PAGE11_1, data in the 6_2-th page PAGE6_2 is moved to the 11_2-th page PAGE11_2, data in the 6_3-th page PAGE6_3 is moved to the 11_3-th page PAGE11_3, and data in the 6_4-th page PAGE6_4 is moved to the 11_4-th page PAGE11_4. Further, the valid data controller 230 may control the memory device so that data in the 7_1-th page PAGE7_1 is moved to the 12_1-th page PAGE12_1 and data in the 7_2-th page PAGE7_2 is moved to the 12_2-th page PAGE12_2.

When the movement of the valid data is completed, the memory controller (e.g., memory controller 200 of FIG. 6) may resume the program operation, which is suspended due to the occurrence of the SPO. Here, the program operation suspended due to the occurrence of the SPO may be resumed from the 12_3-th page PAGE12_3.

When the SPO recovery operation is performed in this way, the parity data controller (e.g., parity data controller 220 of FIG. 6) does not need to perform a separate operation for generating new parity data or resetting previously generated parity data. That is, because a dummy program operation is performed on the 10_4-th page PAGE10_4 to which parity data corresponding to the second chipkill group CK_GROUP2 is programmed, and data programmed to the second chipkill group CK_GROUP2 and data to be programmed to the second chipkill group CK_GROUP2 are newly programmed to the third chipkill group CK_GROUP3, parity data corresponding to the third chipkill group CK_GROUP3 may be programmed to the 15_4-th page PAGE15_4.

FIG. 8 is a diagram illustrating an embodiment in which parity data is generated while a chipkill group unit is changed, that is, the number of pages included in one of the chipkill groups is changed.

Referring to FIGS. 7 and 8, FIG. 8 illustrates first to fourth memory blocks BLK1 to BLK4 of FIG. 7. However, unlike in FIG. 7, in FIG. 8, the unit of (i.e., the number of pages in) a second chipkill group CK_GROUP2 may be changed.

In FIG. 8, descriptions of components substantially similar to those of FIG. 7 will be omitted.

In an embodiment, an SPO may occur while the memory device (e.g., memory device 100 of FIG. 6) performs a program operation on 7_3-th and 7_4-th pages PAGE7_3 and PAGE7_4. When power is turned on again after the occurrence of the SPO, an SPO recovery operation may be performed.

In an embodiment, before an SPO occurs, valid data may be programmed to 6_1-th to 6_4-th pages PAGE6_1 to PAGE6_4, a 7_1-th page PAGE7_1, and a 7_2-th page PAGE7_2. Therefore, the dummy program controller (e.g., the dummy program controller 210 of FIG. 6) may determine, based on SPO information SPO_INF, whether the number of pages to which the valid data is programmed is less than or equal to a reference number.

In the example shown in FIG. 7, the reference number is assumed to be '7'. The reference number ('R' in the equations below) may be set so that the number of unused pages remaining after a dummy program operation is at least sufficient to store all of the valid data in a chipkill group unit along with the parity data for the chipkill group unit. In the illustrated examples, wherein the chipkill group unit is 20 pages, the dummy program operation acts on four pages when the number of pages containing valid data is less than the reference number, and one page is used to store parity data for the chipkill operation, the reference number is '7'. However, in another embodiment where, for example, the chipkill group unit is 28 pages, the reference number may be 11. In some embodiments where the one page in each block that may be dummy programmed are all at a same relative location in their respective memory blocks (that is, are all in the same row as shown in FIG. 7), the reference number R may be set:

$$R = B \cdot \left(\left\lfloor \frac{U-B}{2B} \right\rfloor\right) - P \qquad \text{Equation 1}$$

where B is the number of memory blocks included in the chipkill group (and therefore a minimum number of pages programmed by the dummy program operation when the number of pages containing valid data is less than the reference number), U is the unit (i.e., number of pages) in the chipkill group, and P is the number of pages used to store parity for the chipkill group (e.g., 1). In other embodiments where the one page in each block that may be dummy programmed are immediately subsequent to the last page in which an SPO has occurred, the reference number R may be set:

$$R = \frac{U-B}{2} - P \qquad \text{Equation 2}$$

Because the number of pages to which valid data is programmed among the pages included in the second chipkill group CK_GROUP2 is 6, which is less than or equal to the reference number '7', the dummy program controller (e.g., dummy program controller 210 of FIG. 6) may control the memory device (e.g., memory device 100 of FIG. 6) so that only one page in each memory block among pages subsequent to the page in which the SPO has occurred is dummy-programmed. The page in each memory block that is dummy programmed may be the page immediately subsequent to the relative location of the page in which the SPO has occurred. For example, in the embodiment shown in FIG. 8, where the SPO occurred in pages PAGE7_3 and PAGE7_4 of memory blocks BLK3 and BLK4, the pages subsequent to those pages in those memory blocks (page PAGE8_3 in memory block BLK3 and page PAGE8_4 in memory block BLK4) are dummy-programmed, and pages in the other memory blocks having relative location corresponding to those subsequent pages (page PAGE8_1 of memory block BLK1 and page PAGE8_2 of memory block BLK2) are also dummy-programmed.

In other embodiments, when the number of pages to which valid data is programmed among the pages included in the second chipkill group CK_GROUP2 is greater than the reference number, the dummy program controller may control the memory device so that, as illustrated in FIG. 7, all of the pages subsequent to the page in which the SPO has occurred, among the pages in the second chipkill group CK_GROUP2, are dummy-programmed.

In an embodiment, when the number of pages to which valid data is programmed among the pages included in the second chipkill group CK_GROUP2 is less than or equal to the reference number '7', the dummy program operation may be performed on the 8_1-th page PAGE8_1 of the first memory block BLK1, the 8_2-th page PAGE8_2 of the second memory block BLK2, the 8_3-th page PAGE8_3 of the third memory block BLK3, and the 8_4-th page PAGE8_4 of the fourth memory block BLK4, among the pages subsequent to the 7_4-th page PAGE7_4.

When the dummy program operation performed on the 8_1-th page PAGE8_1 of the first memory block BLK1, the 8_2-th page PAGE8_2 of the second memory block BLK2, the 8_3-th page PAGE8_3 of the third memory block BLK3, and the 8_4-th page PAGE8_4 of the fourth memory block BLK4 is completed, the unit of the second chipkill group CK_GROUP2 may be changed. For example, although the number of pages in each chipkill group is set to 20 as a default value, an SPO may occur during a program operation performed on a specific page among the pages in the second chipkill group CK_GROUP2, and thus the number of remaining pages in the chipkill group after the dummy program operation (in the example shown, 8) may be set as the unit of the second chipkill group CK_GROUP2.

For example, when the dummy program operation is completed, the valid data controller (e.g., the valid data controller 230 of FIG. 6) may control the memory device (e.g., memory device 100 of FIG. 6) so that data in the 6_1-th page PAGE6_1 is moved to the 9_1-th page PAGE9_1, data in the 6_2-th page PAGE6_2 is moved to the 9_2-th page PAGE9_2, data in the 6_3-th page PAGE6_3 is moved to the 9_3-th page PAGE9_3, and data in the 6_4-th page PAGE6_4 is moved to the 9_4-th page PAGE9_4. Further, the valid data controller may control the memory device so that data in the 7_1-th page PAGE7_1 is moved to the 10_1-th page PAGE10_1 and data in the 7_2-th page PAGE7_2 is moved to the 10_2-th page PAGE10_2.

The parity data controller (e.g., the parity data controller 230 of FIG. 6) may newly generate and program parity data while the valid data controller (e.g., the valid data controller 230 of FIG. 6) moves the valid data. For example, when the movement of data to the 9_1-th page PAGE9_1 is initiated, parity data for the second chipkill group CK_GROUP2 may be generated again starting from an initial value (e.g., 0). The generated parity data may be programmed to the 10_4-th page PAGE10_4 after all of the other pages of the second chipkill group CK_GROUP2 are programmed.

Here, information indicating that the data programmed to the 8_1-th to 8_4-th pages PAGE8_1 to PAGE8_4 is dummy data may be stored in a buffer memory in the memory controller (e.g., memory controller 200 of FIG. 6), and the stored information may be read during chipkill decoding.

When the movement of the valid data is completed, the memory controller (e.g., memory controller 200 of FIG. 6) may resume the program operation that was suspended due to the occurrence of the SPO. Here, the program operation suspended due to the occurrence of the SPO may be resumed from the 10_3-th page PAGE10_3. Note that because the 10_4-th page PAGE10_4 is used to hold parity for the second chipkill group CK_GROUP2, the data that before the SPO was intended to be stored in the 7_4-th page PAGE7_4 may be stored in a chipkill group other than the second chipkill group CK_GROUP2.

In accordance with the above-described process, the unit of a chipkill group is newly set, and thus a problem may arise in that information indicating that the unit of the chipkill group has changed and information indicating a position to which the dummy data is programmed should be separately stored.

Figure 9:
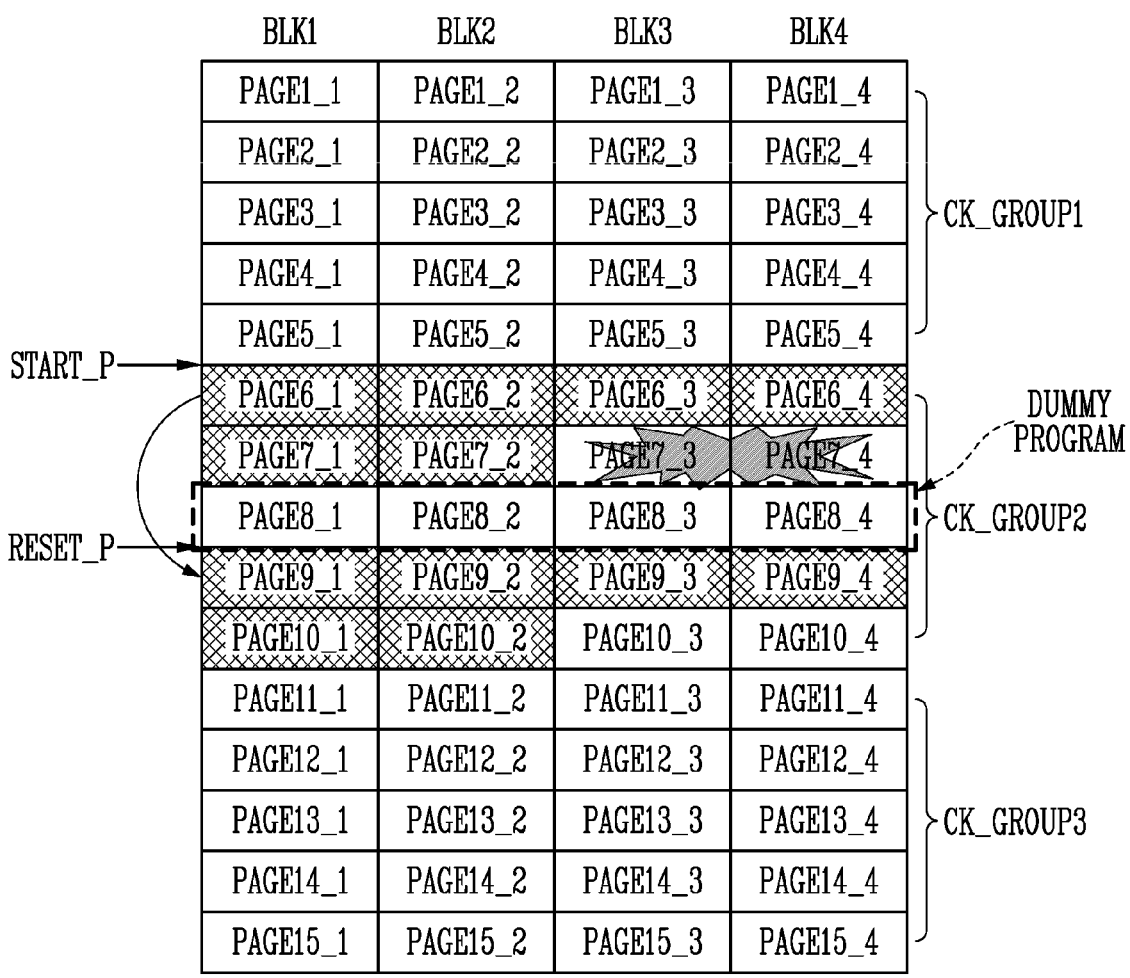
FIG. 9 illustrates an embodiment in which parity data is generated while a chipkill group unit is maintained.

FIG. 9 is a diagram illustrating an embodiment in which parity data is generated while a chipkill group unit is maintained.

Referring to FIGS. 8 and 9, FIG. 9 illustrates the first to fourth memory blocks BLK1 to BLK4 of FIG. 8. However, unlike in FIG. 8, in FIG. 9, the unit of a second chipkill group CK_GROUP2 may be maintained by the SPO recovery operation.

In FIG. 9, descriptions of components substantially similar to those of FIG. 8 will be omitted.

In an embodiment, at the same time that a program operation on the 6_1-th page PAGE6_1 in the second chipkill group CK_GROUP2 is initiated, parity data corresponding to the second chipkill group may also be generated (START_P).

However, an SPO has occurred while the memory device (e.g., memory device 100 of FIG. 6) was performing a program operation on 7_3-th and 7_4-th pages PAGE7_3 and PAGE7_4. When power is turned on again, an SPO recovery operation may be performed.

Unlike FIG. 8, when the SPO recovery operation is performed, the unit of the second chipkill group CK_GROUP2 may be maintained. For example, at an initial stage, the number of pages in each chipkill group is set to 20 as a default value, and the default value may be maintained even if an SPO occurs.

In order to maintain the unit of the second chipkill group CK_GROUP2, when the data in the 6_1-th page PAGE6_1 is moved to the 9_1-th page PAGE9_1 after the dummy program operation has been performed on the 8_1-th page PAGE8_1 of the first memory block BLK1, the 8_2-th page PAGE8_2 of the second memory block BLK2, the 8_3-th page PAGE8_3 of the third memory block BLK3, and the 8_4-th page PAGE8_4 of the fourth memory block BLK4 has been completed, the parity data controller (e.g., the parity data controller 220 of FIG. 6) may reset the generated parity data (RESET_P). The parity data controller (e.g., the parity data controller 220 of FIG. 6) may control the generation of new parity data while resetting the parity data. Further, the parity data controller (e.g., the parity data controller 220 of FIG. 6) may store information about the position of the page at which the generation of new parity data is started.

In detail, when data in the 6_1-th page PAGE6_1 is moved to the 9_1-th page PAGE9_1, the parity data controller (e.g., the parity data controller 220 of FIG. 6) may store information about the 9_1-th page PAGE9_1 which is a position at which valid data is started, and may newly generate parity data beginning when a program operation is performed on the 9_1-th page PAGE9_1. The newly generated parity data, generated using the valid data programmed into the 9_1-th page PAGE9_1 through 10_3-th page PAGE10_3, may be programmed to the 10_4-th page PAGE10_4.

When the above-described SPO recovery operation is performed, information indicating a position to which the dummy data is programmed and the information about the unit-changed chipkill group are not separately stored, and thus the efficiency of the SPO recovery operation may be improved.

Figure 10:
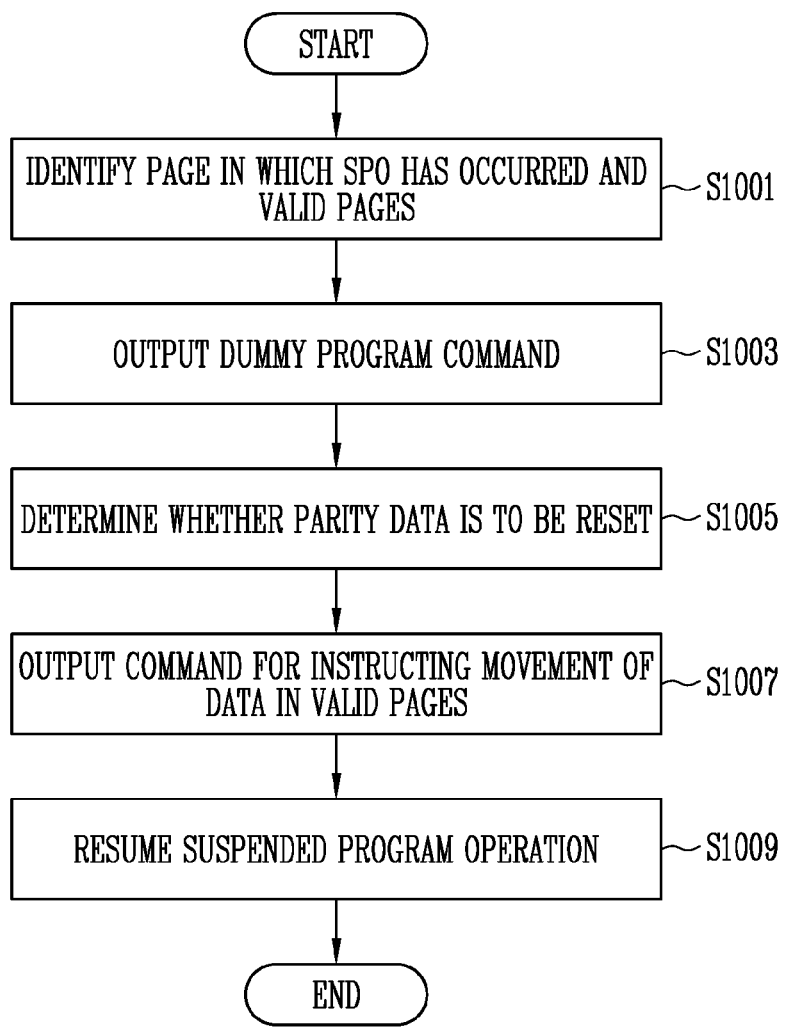
FIG. 10 illustrates operation of a memory controller according to an embodiment of the present disclosure.

FIG. 10 is a flowchart illustrating the operation of a memory controller according to an embodiment of the present disclosure.

Referring to FIG. 10, at step S1001, when an SPO occurs during a program operation performed on a selected page, the memory controller may identify the page in which the SPO has occurred and one or more valid pages to which valid data is programmed.

In detail, the memory controller may identify the page in which the SPO has occurred among a plurality of pages in a chipkill group. Here, the chipkill group may be a unit by which parity data for chipkill decoding is generated, and chipkill decoding may be a correction operation performed after an error correction decoding operation, such as an ECC check in a page, has failed. The parity data may be data corresponding to the chipkill group, and may be generated and programmed on a specific unit (that is, number of pages in the chipkill group) basis.

When the position of the page in which the SPO has occurred in the chipkill group is identified, the memory controller may identify valid pages, which are pages in the chipkill group that were successfully programmed before the SPO occurred in the chipkill group.

At step S1003, the memory controller may output one or more dummy program commands based on the number of valid pages in the chipkill group.

For example, when the number of valid pages is in a predetermined range, the memory controller may output one or more dummy program commands instructing that only one page in each memory block in the chipkill group be dummy-programmed. When the number of valid pages is not in the predetermined range, the memory controller may output one or more dummy program commands instructing that all as-yet unprogrammed pages in the chipkill group be dummy-programmed; that is, the memory controller may control the memory device so that all of pages in an erased state in the chipkill group are dummy-programmed.

At step S1005, the memory controller may determine whether parity data is to be reset depending on the number of dummy-programmed pages. For example, when only one page in each memory block is dummy-programmed, the memory controller may determine that the parity data is to be reset. However, when all of the pages in the chipkill group are dummy-programmed, the memory controller may determine that parity data is not to be reset.

At step S1007, the memory controller may output a command instructing the movement of the data in the valid pages to the memory device. The valid pages may refer to pages successfully programmed before the SPO occurs among the pages in the chipkill group in which the SPO has occurred. Here, a position to which the data in the valid pages is to be moved may be a page in the chipkill group subsequent to the page on which the dummy program operation has been completed, or may be a page in another chipkill group.

At step S1009, when all of the data in the valid pages is moved, the memory controller may resume a suspended program operation. That is, the memory device may be controlled such that the program operation suspended due to the occurrence of the SPO is resumed.

Figure 11:
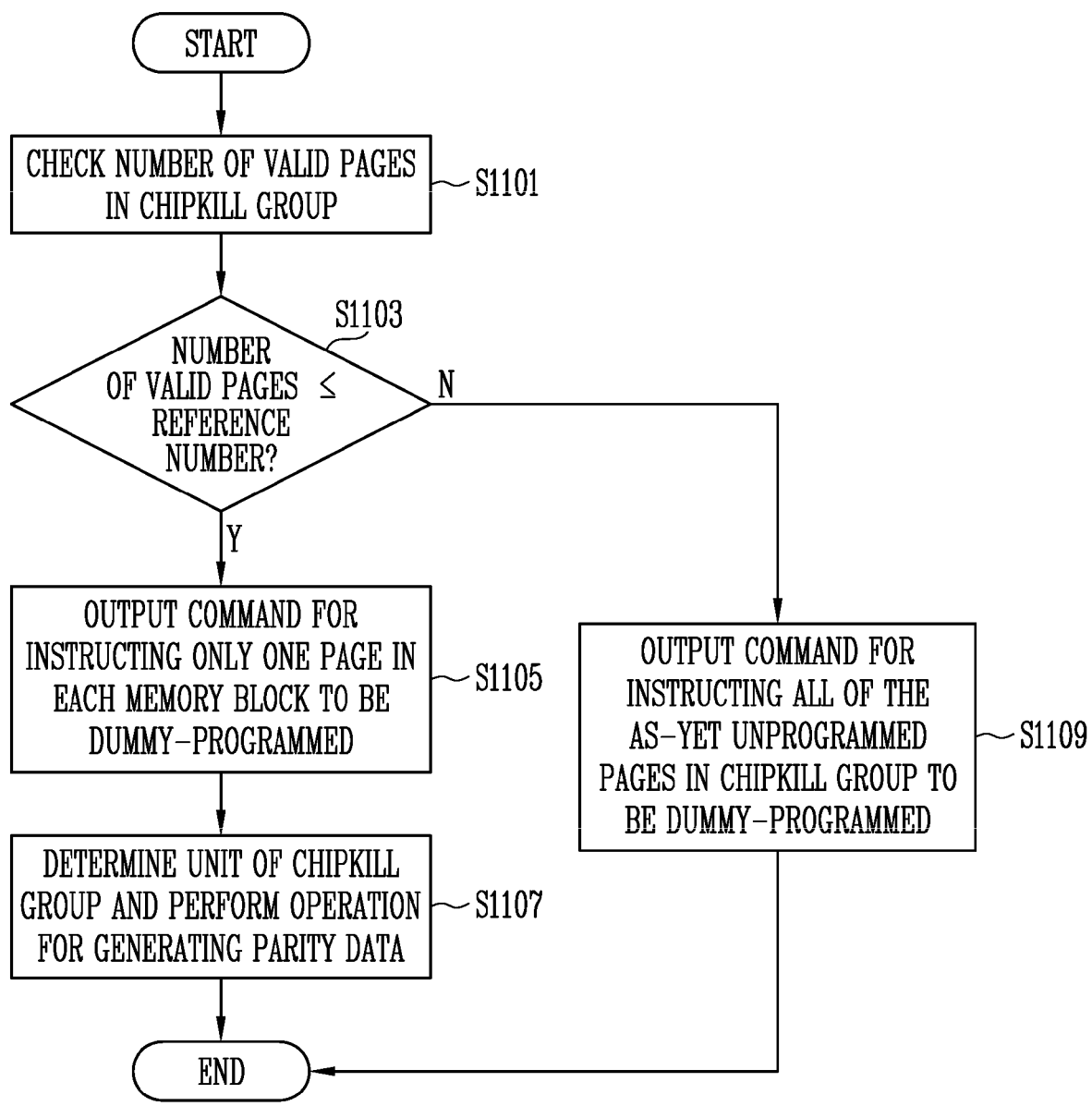
FIG. 11 illustrates operation of a memory controller according to an embodiment of the present disclosure.

FIG. 11 is a flowchart illustrating the operation of a memory controller according to an embodiment of the present disclosure.

FIG. 11 is a flowchart illustrating detailed steps that may be used to perform step S1003 of FIG. 10.

At step S1101, the memory controller may check the number of valid pages in the chipkill group in which an SPO has occurred. The valid pages may refer to pages successfully programmed before the SPO occurred among the pages in the chipkill group in which the SPO has occurred.

At step S1103, the memory controller may determine whether the number of valid pages is less than or equal to a reference number. For example, the memory controller may determine whether the number of valid pages included in the chipkill group is less than or equal to the reference number. The reference number may be preset.

When the number of valid pages is less than or equal to the reference number (path 'Y'), the process may proceed to step S1105, whereas when the number of valid pages is greater than the reference number (path 'N'), the process may proceed to step S1109.

When the number of pages programmed successfully among the pages included in the chipkill group in which the SPO has occurred is less than or equal to the reference number (path 'Y'), that is, when the number of valid pages is less than or equal to the reference number, the memory controller may output one or more commands instructing that only one page in each memory block be dummy-programmed at step S1105. In this case, a continuous write operation may be performed without all of the remaining pages in the chipkill group being dummy-programmed.

When a dummy program operation performed on only one page in each memory block is completed, the memory controller may determine the unit of the chipkill group and perform an operation for generating parity data at step S1107.

For example, when it is determined that the unit of the chipkill group is to be changed, the memory controller may store information indicating a position to which dummy data is programmed and information about a changed size of the chipkill group. The changed size of the chipkill group may correspond to the number of pages in the chipkill group that are subsequent to the dummy-programmed pages. Also, the memory controller may reset the parity data so that parity data corresponding to the size-changed chipkill group is generated. Thereafter, when an error correction operation is performed based on the parity data, the corresponding information (that is, the pages subsequent to the dummy-programmed pages) may be read.

However, when it is determined that the unit of the chipkill group is not to be changed, the memory controller may control the generation of new parity data while resetting parity data. Furthermore, information about the position of a page at which the generation of new parity data is started may be stored.

When the number of pages programmed successfully among the pages included in the chipkill group in which the SPO has occurred is not less than or equal to the reference number (path 'N'), that is, when the number of valid pages is greater than the reference number, the memory controller may output one or more commands instructing that all of the as-yet unprogrammed pages in the chipkill group be dummy-programmed at step S1109. In this case, all of pages subsequent to the page in which the SPO has occurred may be dummy-programmed. In this case, a continuous writing operation may be performed after all of the remaining pages in the chipkill group have been dummy-programmed.

Figure 12:
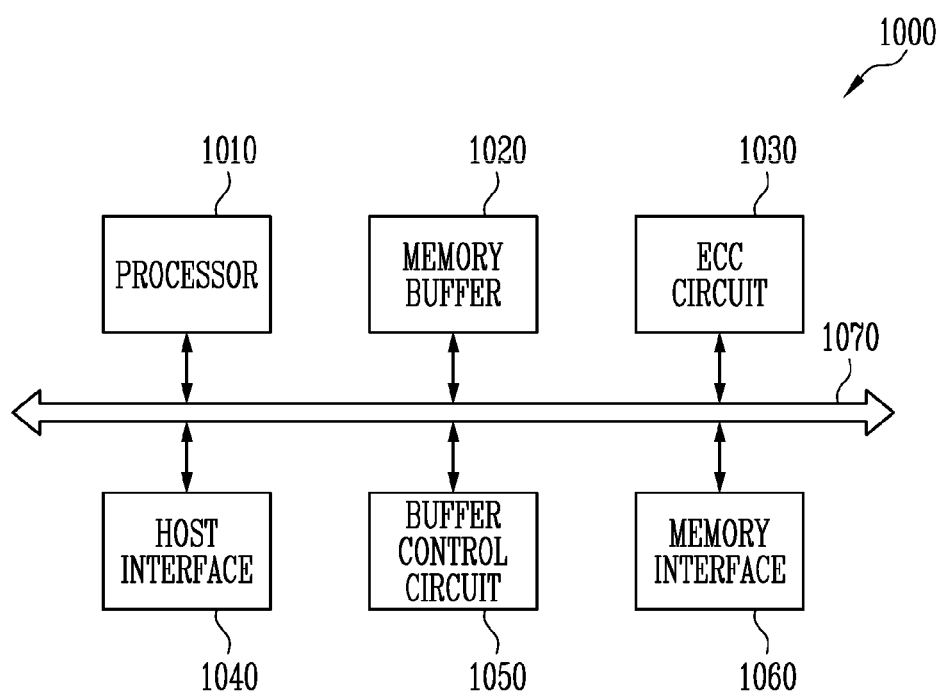
FIG. 12 illustrates an embodiment of the memory controller of FIG. 1.

FIG. 12 is a diagram illustrating an embodiment of the memory controller 200 of FIG. 1.

A memory controller 1000 is coupled to a host and a memory device. In response to a request received from the host, the memory controller 1000 may access the memory device. For example, the memory controller 1000 may be configured to control write, read, erase, and background operations of the memory device. The memory controller 1000 may provide an interface between the memory device and the host. The memory controller 1000 may run firmware for controlling the memory device.

The memory controller 1000 may include a processor 1010, a memory buffer 1020, an error correction code (ECC) circuit 1030, a host interface 1040, a buffer control circuit 1050, a memory interface 1060, and a bus 1070.

The bus 1070 may provide channels for communication between components of the memory controller 1000.

The processor 1010 may control the overall operation of the memory controller 1000 and may perform a logical operation. The processor 1010 may communicate with an external host through the host interface 1040 and also communicate with the memory device through the memory interface 1060. Further, the processor 1010 may communicate with the memory buffer 1020 through the buffer control circuit 1050. The processor 1010 may control the operation of the storage device by using the memory buffer 1020 as a working memory, a cache memory or a buffer memory.

The processor 1010 may perform the function of a flash translation layer (FTL). The processor 1010 may translate a logical block address (LBA), provided by the host, into a physical block address (PBA) through the FTL. The FTL may receive the LBA and translate the LBA into the PBA using a mapping table. Examples of address mapping performed through the FTL may vary according to a mapping unit. Representative address mapping may include page mapping, block mapping, and hybrid mapping.

The processor 1010 may randomize data received from the host. For example, the processor 1010 may use a randomizing seed to randomize data received from the host. The randomized data may be provided, as data to be stored, to the memory device and may be programmed in the memory cell array.

The processor 1010 may run software or firmware to perform the randomizing or derandomizing operation.

In an embodiment, the processor 1010 may run software or firmware to perform randomizing and derandomizing operations.

The memory buffer 1020 may be used as a working memory, a cache memory, or a buffer memory of the processor 1010. The memory buffer 1020 may store codes and commands executed by the processor 1010. The memory buffer 1020 may store data that is processed by the processor 1010. The memory buffer 1020 may include a static RAM (SRAM) or a dynamic RAM (DRAM).

The ECC circuit 1030 may perform error correction. The ECC circuit 1030 may perform error correction code (ECC) encoding based on data to be written to the memory device through the memory interface 1060. The ECC-encoded data may be transferred to the memory device through the memory interface 1060. The ECC circuit 1030 may perform ECC decoding based on data received from the memory device through the memory interface 1060. In an example, the ECC circuit 1030 may be included as the component of the memory interface 1060 in the memory interface 1060.

The host interface 1040 may communicate with the external host under the control of the processor 1010. The host interface 1040 may perform communication using at least one of various communication technologies such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication technologies.

The buffer control circuit 1050 may control the memory buffer 1020 under the control of the processor 1010.

The memory interface 1060 may communicate with the memory device under the control of the processor 1010. The memory interface 1060 may transmit/receive commands, addresses, and data to/from the memory device through channels.

In an embodiment, the memory controller 1000 may not include the memory buffer 1020 and the buffer control circuit 1050.

In an embodiment, the processor 1010 may control the operation of the memory controller 1000 using codes. The processor 1010 may load codes from a nonvolatile memory device (e.g., ROM) provided in the memory controller 1000. In an embodiment, the processor 1010 may load codes from the memory device through the memory interface 1060.

In an embodiment, the bus 1070 of the memory controller 1000 may be divided into a control bus and a data bus. The data bus may be configured to transmit data in the memory controller 1000, and the control bus may be configured to transmit control information such as commands or addresses in the memory controller 1000. The data bus and the control bus may be isolated from each other, and may neither interfere with each other nor influence each other. The data bus may be coupled to the host interface 1040, the buffer control circuit 1050, the ECC circuit 1030, and the memory interface 1060. The control bus may be coupled to the host interface 1040, the processor 1010, the buffer control circuit 1050, the memory buffer 1020, and the memory interface 1060.

In an embodiment, when an SPO occurs while the memory device (e.g., memory device 100 of FIG. 1) performs a program operation, the processor 1010 may control an SPO recovery operation.

In detail, during the SPO recovery operation, the processor 1010 may identify a page in which the SPO has occurred in a chipkill group, and may identify valid pages of the chipkill group on which the program operation has been effectively completed before the occurrence of the SPO. The chipkill group may be a unit by which parity data for chipkill decoding is generated, and chipkill decoding may be a correction operation performed after an error correction decoding operation has failed. The parity data may be data corresponding to the chipkill group, and may be generated and programmed on a specific unit basis.

Thereafter, the processor 1010 may determine pages on which a dummy program operation is to be performed based on the number of valid pages. For example, when the number of valid pages is less than or equal to a reference number, the processor 1010 may determine that only one page in each memory block is to be dummy-programmed, whereas when the number of valid pages is greater than the reference number, the processor 1010 may determine that all pages in the chipkill group are to be dummy-programmed.

When the dummy program operation is completed, the processor 1010 may perform continuous writing of data in the valid pages. That is, the processor 1010 may control the memory device (e.g., the memory device 100 of FIG. 1) so that data in the valid pages is programmed to pages in the chipkill group beginning from a page subsequent to the final page on which the dummy program operation has been performed.

When the continuous write operation is performed, the processor 1010 may control the generation of parity data. For example, when all pages in the chipkill group are dummy-programmed, the unit of the chipkill group is not changed, and thus the processor 1010 may not perform a separate operation for generating parity data.

However, when some pages in the chipkill group are dummy-programmed, the unit of the chipkill group may or may not be changed.

In detail, when the unit of the chipkill group is changed, the processor 1010 may store information indicating a position to which the dummy data is programmed and information about a changed size of the chipkill group. Also, the memory controller may reset the parity data so that parity data corresponding to the size-changed chipkill group is generated.

When the unit of the chipkill group is not changed, the processor 1010 may control the generation of new parity data while resetting parity data. Furthermore, information about the position of a page at which the generation of new parity data is started may be stored.

Figure 13:
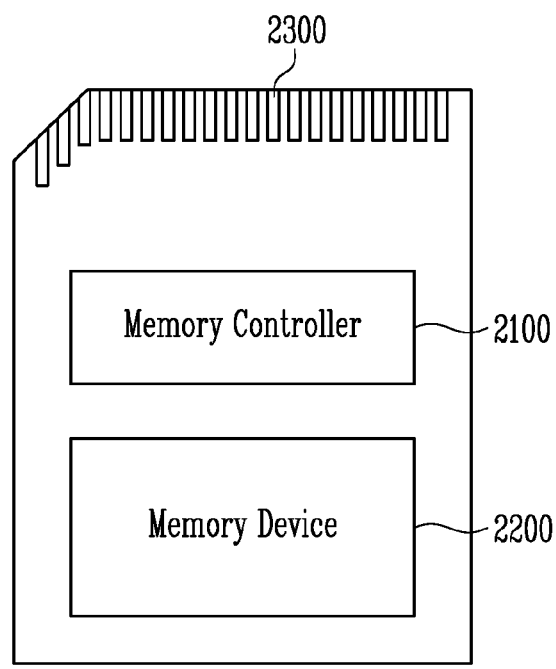
FIG. 13 illustrates a memory card system to which a storage device according to an embodiment of the present disclosure is applied.

FIG. 13 is a block diagram illustrating a memory card system to which the storage device according to an embodiment of the present disclosure is applied.

Referring to FIG. 13, a memory card system 2000 may include a memory controller 2100, a memory device 2200, and a connector 2300.

The memory controller 2100 is coupled to the memory device 2200. The memory controller 2100 may access the memory device 2200. For example, the memory controller 2100 may be control read, write, erase, and background operations of the memory device 2200. The memory controller 2100 may provide an interface between the memory device 2200 and a host. The memory controller 2100 may run firmware for controlling the memory device 2200. The memory device 2200 may be implemented in the same way as the memory device 100 described above with reference to FIG. 1.

In an embodiment, the memory controller 2100 may include components, such as a RAM, a processor, a host interface, a memory interface, and an ECC circuit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication protocols such as universal serial bus (USB), multi-media card (MMC), embedded MMC (eMMC), peripheral component interconnection (PCI), PCI-express (PCI-E), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) protocols. In an embodiment, the connector 2300 may be defined by at least one of the above-described various communication protocols.

In an embodiment, the memory device 2200 may be implemented as any of various nonvolatile memory devices, such as an Electrically Erasable and Programmable ROM (EEPROM), a NAND flash memory, a NOR flash memory, a Phase-change RAM (PRAM), a Resistive RAM (Re-RAM), a Ferroelectric RAM (FRAM), a Spin Transfer Torque Magnetic RAM (STT-MRAM).

The memory controller 2100 and the memory device 2200 may be integrated into a single semiconductor device to configure a memory card. For example, the memory controller 2100 and the memory device 2200 may be integrated into a single semiconductor device to configure a memory card such as a PC card (as per the personal computer memory card international association: PCMCIA), a compact flash (CF) card, a smart media card (SM or SMC), a memory stick, a multimedia card (MMC, RS-MMC, MMC-micro or eMMC), an SD card (SD, miniSD, microSD, or SDHC), or a universal flash storage (UFS).

In an embodiment, when an SPO occurs while the memory device 2200 performs a program operation, the memory controller 2100 may control an SPO recovery operation.

In detail, during the SPO recovery operation, the memory controller 2100 may identify a page in which the SPO has occurred in a chipkill group, and may identify valid pages in the chipkill group on which the program operation has been effectively completed before the occurrence of the SPO. The chipkill group may be a unit by which parity data for chipkill decoding is generated, and chipkill decoding may be a correction operation performed after an error correction decoding operation has failed. The parity data may be data corresponding to the chipkill group, and may be generated and programmed on a specific unit basis.

Thereafter, the memory controller 2100 may determine pages on which a dummy program operation is to be performed based on the number of valid pages. For example, when the number of valid pages is less than or equal to a reference number, the memory controller 2100 may determine that only one page in each memory block is to be dummy-programmed, whereas when the number of valid pages is greater than the reference number, the memory controller 2100 may determine that all pages (or, in an embodiment, all pages that have not been programmed since they were last erased) in the chipkill group are to be dummy-programmed.

When the dummy program operation is completed, the memory controller 2100 may perform continuous writing of data in the valid pages. That is, the memory controller 2100 may control the memory device 2200 so that data in the valid pages is programmed to pages from a page subsequent to the final page on which the dummy program operation has been performed. The pages to be programmed may be in the chipkill group or may be in another chipkill group.

When the continuous write operation is performed, the memory controller 2100 may control the generation of parity data. For example, when all pages in the chipkill group are dummy-programmed, the unit of the chipkill group is not changed, and thus the memory controller 2100 may not perform a separate operation for generating parity data.

However, when some pages in the chipkill group are dummy-programmed, the unit of the chipkill group may or may not be changed.

In detail, when the unit of the chipkill group is changed, the memory controller 2100 may store information indicating a position to which the dummy data is programmed and information about a changed size of the chipkill group. Also, the memory controller 2100 may reset the parity data so that parity data corresponding to the size-changed chipkill group is generated.

When the unit of the chipkill group is not changed, the memory controller 2100 may control the generation of new parity data while resetting parity data. Furthermore, information about the position of a page at which the generation of new parity data is started may be stored.

Figure 14:
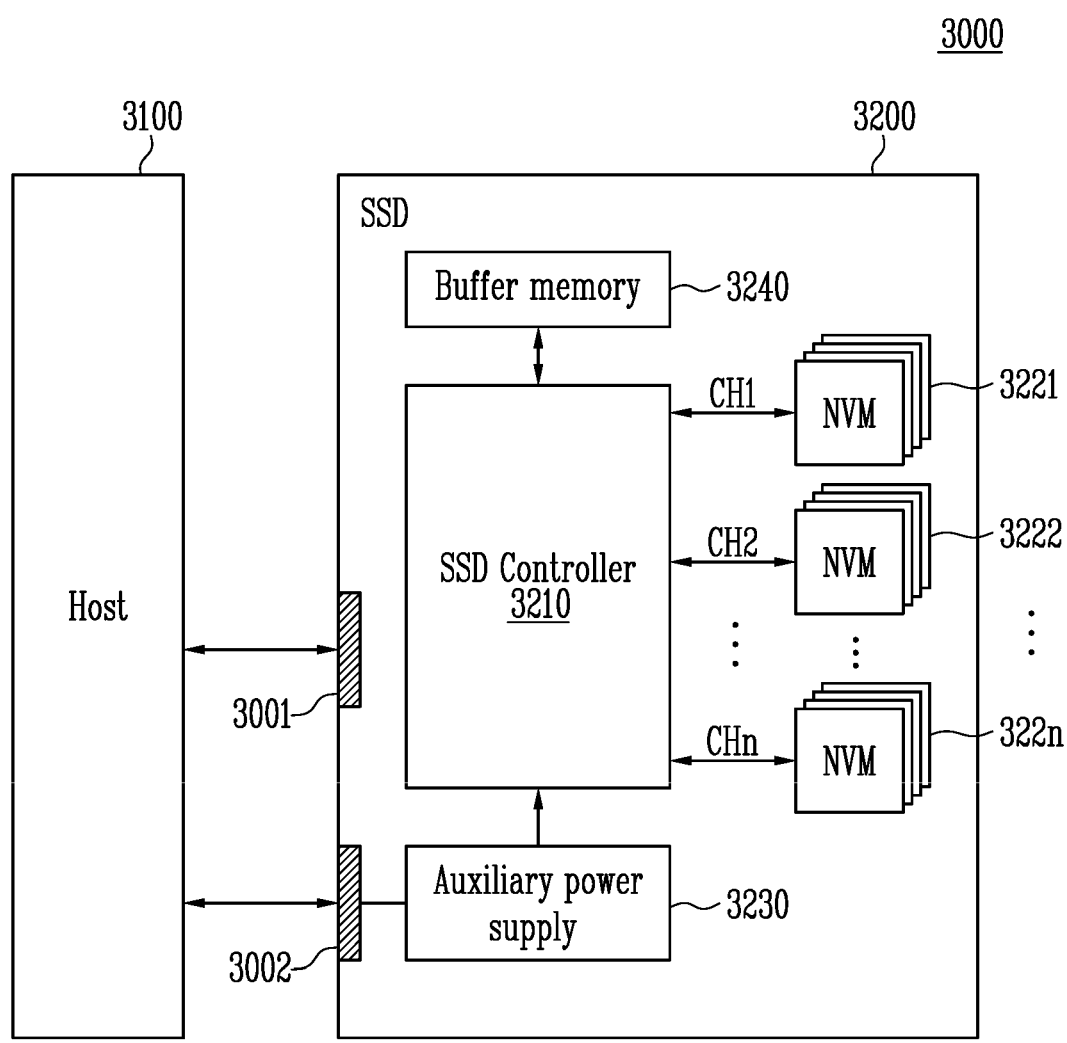
FIG. 14 illustrates a solid state drive (SSD) system to which a storage device according to an embodiment of the present disclosure is applied.

FIG. 14 is a block diagram illustrating an example of a solid state drive (SSD) system 3000 to which a storage device according to an embodiment of the present disclosure is applied.

The SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of nonvolatile memories 3221 to 322n, an auxiliary power supply 3230, and a buffer memory 3240.

In an embodiment, the SSD controller 3210 may perform the function of the memory controller 200 described above with reference to FIG. 1.

The SSD controller 3210 may control the plurality of flash memories 3221 to 322n in response to the signals SIG received from the host 3100. In an embodiment, the signals SIG may be signals based on the interfaces of the host 3100 and the SSD 3200. For example, the signals SIG may be signals defined by at least one of various interfaces such as universal serial bus (USB), multi-media card (MMC), embedded MMC (eMMC), peripheral component interconnection (PCI), PCI-express (PCI-E), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100 and may be charged. The auxiliary power supply 3230 may supply the power of the SSD 3200 when the supply of power from the host 3100 is not continuously provided. In an embodiment, the auxiliary power supply 3230 may be positioned inside the SSD 3200 or positioned outside the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of nonvolatile memories 3221 to 322n or may temporarily store metadata (e.g., mapping tables) of the nonvolatile memories 3221 to 322n. The buffer memory 3240 may include volatile memories such as DRAM, SDRAM, DDR SDRAM, LPDDR SDRAM, and GRAM or nonvolatile memories such as FRAM, ReRAM, STT-MRAM, and PRAM.

In an embodiment, when an SPO occurs while any one of the nonvolatile memories 3221 to 322n is performing a program operation, the SSD controller 3210 may control an SPO recovery operation.

In detail, during the SPO recovery operation, the SSD controller 3210 may identify a page in which the SPO has occurred in a chipkill group, and may identify valid pages in the chipkill group on which the program operation has been effectively completed before the occurrence of the SPO. The chipkill group may be a unit by which parity data for chipkill decoding is generated, and chipkill decoding may be a correction operation performed after an error correction decoding operation has failed. The parity data may be data corresponding to the chipkill group, and may be generated and programmed on a specific unit basis.

Thereafter, the SSD controller 3210 may determine pages on which a dummy program operation is to be performed based on the number of valid pages. For example, when the number of valid pages is less than or equal to a reference number, the SSD controller 3210 may determine that only one page in each memory block used in the chipkill group is to be dummy-programmed, whereas when the number of valid pages is greater than the reference number, the SSD controller 3210 may determine that all as-yet unprogrammed pages in the chipkill group are to be dummy-programmed.

When the dummy program operation is completed, the SSD controller 3210 may perform continuous writing of data in the valid pages. That is, the SSD controller 3210 may control the plurality of nonvolatile memories 3221 to 322n so that data in the valid pages is programmed to pages from a page subsequent to the final page on which the dummy program operation has been performed. The pages to be programmed may be in the chipkill group or may be in another chipkill group.

When the continuous write operation is performed, the SSD controller 3210 may control the generation of parity data. For example, when all pages in the chipkill group are dummy-programmed, the unit of the chipkill group is not changed, and thus the SSD controller 3210 may not perform a separate operation for generating parity data.

However, when some pages in the chipkill group are dummy-programmed, the unit of the chipkill group may or may not be changed.

In detail, when the unit of the chipkill group is changed, the SSD controller 3210 may store information indicating a position to which the dummy data is programmed and information about a changed size of the chipkill group. Also, the SSD controller 3210 may reset the parity data so that parity data corresponding to the size-changed chipkill group is generated.

When the unit of the chipkill group is not changed, the SSD controller 3210 may control the generation of new parity data while resetting parity data. Furthermore, information about the position of a page at which the generation of new parity data is started may be stored.

Figure 15:
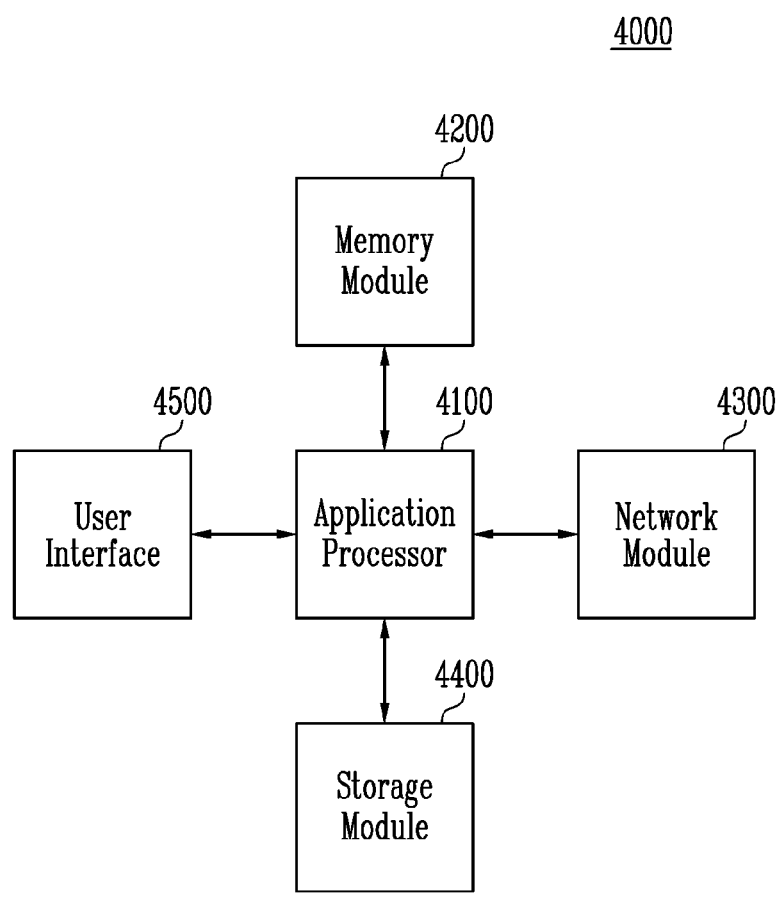
FIG. 15 illustrates a user system to which a storage device according to an embodiment of the present disclosure is applied.

FIG. 15 is a block diagram illustrating a user system to which the storage device according to an embodiment of the present disclosure is applied.

Referring to FIG. 15, a user system 4000 may include an application processor 4100, a memory module 4200, a network module 4300, a storage module 4400, and a user interface 4500.

The application processor 4100 may run components included in the user system 4000, an Operating System (OS) or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory or a cache memory of the user system 4000. The memory module 4200 may include volatile RAMs such as DRAM, SDRAM, DDR SDRAM, DDR2 SDRAM, DDR3 SDRAM, LPDDR SDRAM, LPDDR2 SDRAM, and LPDDR3 SDRAM, or nonvolatile RAMs such as PRAM, ReRAM, MRAM, and FRAM. In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as Code Division Multiple Access (CDMA), Global System for Mobile communication (GSM), wideband CDMA (WCDMA), CDMA-2000, Time Division Multiple Access (TDMA), Long Term Evolution (LTE), WiMAX, WLAN, UWB, Bluetooth, or Wi-Fi communication. In an embodiment, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a Phase-change RAM (PRAM), a Magnetic RAM (MRAM), a Resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 4000.

In an embodiment, the storage module 4400 may include a plurality of nonvolatile memory devices, each of which may be operated in the same way as the memory device described above with reference to FIGS. 2 and 3. The storage module 4400 may be operated in the same way as the storage device 50 described above with reference to FIG. 1.

The user interface 4500 may include interfaces which input data or instructions to the application processor 4100 or output data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as a Liquid Crystal Display (LCD), an Organic Light Emitting Diode (OLED) display device, an Active Matrix OLED (AMOLED) display device, an LED, a speaker, and a monitor.

In an embodiment, when an SPO occurs while the storage module 4400 is performing a program operation, the application processor 4100 may control an SPO recovery operation.

In detail, during the SPO recovery operation, the application processor 4100 may identify a page in which the SPO has occurred in a chipkill group, and may identify valid pages in the chipkill group on which the program operation has been effectively completed before the occurrence of the SPO. The chipkill group may be a unit by which parity data for chipkill decoding is generated, and chipkill decoding may be a correction operation performed after an error correction decoding operation has failed. The parity data may be data corresponding to the chipkill group, and may be generated and programmed on a specific unit basis.

Thereafter, the application processor 4100 may determine pages on which a dummy program operation is to be performed based on the number of valid pages. For example, when the number of valid pages is less than or equal to a reference number, the application processor 4100 may determine that only one page in each memory block used by the chipkill group is to be dummy-programmed, whereas when the number of valid pages is greater than the reference number, the application processor 4100 may determine that all as-yet unprogrammed pages in the chipkill group are to be dummy-programmed.

When the dummy program operation is completed, the application processor 4100 may perform continuous writing of data in the valid pages. That is, the application processor 4100 may control the storage module 4400 so that data in the valid pages is programmed to pages from a page subsequent to the final page on which the dummy program operation has been performed. The pages to be programmed may be in the chipkill group or may be in another chipkill group.

When the continuous write operation is performed, the application processor 4100 may control the generation of parity data. For example, when all pages in the chipkill group are dummy-programmed, the unit of the chipkill group is not changed, and thus the application processor 4100 may not perform a separate operation for generating parity data.

However, when some pages in the chipkill group are dummy-programmed, the unit of the chipkill group may or may not be changed.

In detail, when the unit of the chipkill group is changed, the application processor 4100 may store information indicating a position to which the dummy data is programmed and information about a changed size of the chipkill group. Also, the application processor 4100 may reset the parity data so that parity data corresponding to the size-changed chipkill group is generated.

When the unit of the chipkill group is not changed, the application processor 4100 may control the generation of new parity data while resetting parity data. Furthermore, information about the position of a page at which the generation of new parity data is started may be stored.

In accordance with the present disclosure, in the event of a sudden power-off, parity data is reset after a dummy program operation has been performed while the unit of parity data generation is maintained, and thus unnecessary consumption of memory blocks may be prevented.

What is claimed is:

1. A memory controller for controlling a memory device including a plurality of memory blocks, each memory block having a plurality of pages, the memory controller comprising:
a dummy program controller configured to, after a sudden power-off has occurred while a program operation was being performed on a page selected from among the plurality of pages of one of the memory blocks, control a dummy program operation for recovering from the sudden power-off,
a parity data controller configured to control resetting and generation of parity data for chipkill decoding based on pages on which the dummy program operation is determined to be performed; and
a valid data controller configured to control movement of valid data based on a number of pages on which the dummy program operation is to be performed,
wherein the dummy program controller is configured to determine a number of valid pages included in a first group among a plurality of groups, which first group includes the page in which the sudden power-off has occurred, and determine the pages on which the dummy program operation is to be performed based on the number of valid pages, and
wherein each of the plurality of groups includes a respective plurality of pages from each of the plurality of memory blocks.

2. The memory controller according to claim 1,
wherein the plurality of pages of the plurality of memory blocks are divided into the plurality of groups depending on whether the pages are located at identical positions in the plurality of memory blocks, and
wherein the valid pages are pages on which the program operation is effectively completed before the sudden power-off occurs.

3. The memory controller according to claim 2, wherein the dummy program controller is configured to determine the pages on which the dummy program operation is to be performed by comparing the number of valid pages with a reference number.

4. The memory controller according to claim 3, wherein the dummy program controller is configured to:
when the number of valid pages is greater than the reference number, control the memory device so that all pages included in the first group that are in an erased state are dummy-programmed.

5. The memory controller according to claim 4, wherein:
the valid data controller is configured to, when the dummy program operation is completed, control the memory device so that data in the valid pages is programmed again to pages from a page subsequent to a final page on which the dummy program operation is performed, and
the parity data controller is configured to perform control such that generation of the parity data is initiated when the data in the valid pages is moved.

6. The memory controller according to claim 3, wherein the dummy program controller is configured to:
when the number of valid pages is less than or equal to the reference number, control the memory device so that only one page in each of the plurality of memory blocks, among pages subsequent to the page in which the sudden power-off has occurred, is dummy-programmed.

7. The memory controller according to claim 6, wherein the parity data controller is configured to determine whether a size of the first group is to be maintained and whether the parity data is to be reset after the dummy program operation has been completed.

8. The memory controller according to claim 7, wherein the parity data controller is configured to, when the size of the first group is to be changed, store information indicating a position of the dummy-programmed page and information about the changed size of the first group.

9. The memory controller according to claim 8, wherein the parity data controller is configured to, when the chipkill decoding is performed, output information indicating the position of the dummy-programmed page and the information about the changed size of the first group.

10. The memory controller according to claim 7, wherein the parity data controller is configured to, when the size of the first group is to be maintained, reset the parity data.

11. The memory controller according to claim 10, wherein the parity data controller is configured to control the memory device so that, after the parity data has been reset, new parity data is generated, and to store information about a position of a page at which generation of the new parity data is started.

12. A method of operating a memory controller, the memory controller controlling a memory device including a plurality of memory blocks, each memory blocks having a plurality of pages, the method comprising:
- sensing a sudden power-off occurring while a program operation is being performed on a page from among the plurality of pages of the plurality of memory blocks;
- during a recovery operation performed after the sudden power-off has been sensed, determining pages on which a dummy program operation is to be performed from among the plurality of pages of the plurality of memory blocks;
- controlling resetting and generation of parity data for chipkill decoding based on the pages on which the dummy program operation is to be performed; and
- moving valid data based on a number of pages on which the dummy program operation is to be performed,
- wherein determining the pages on which the dummy program operation is to be performed includes:
- determining a number of valid pages included in a first group among a plurality of groups, which first group includes the page in which the sudden power-off has occurred; and
- determining the pages on which the dummy program operation is to be performed based on the number of valid pages, and
- wherein each of the plurality of groups includes a respective plurality of pages from each of the plurality of memory blocks.

13. The method according to claim 12, wherein:
- wherein the plurality of pages of the plurality of memory blocks are divided into the plurality of groups depending on whether the pages are located at identical positions in the plurality of memory blocks, and
- wherein the valid pages are pages on which the program operation is effectively completed before the sudden power-off occurs.

14. The method according to claim 13, wherein determining the pages on which the dummy program operation is to be performed includes:
- when the number of valid pages is greater than a reference number, determining that all of pages included in the first group that are in an erased state are to be dummy-programmed.

15. The method according to claim 14,
- wherein moving the valid data includes controlling the memory device so that data in the valid pages is programmed again to pages from a page subsequent to a final page on which the dummy program operation is performed, and
- wherein controlling the resetting and generation of the parity data includes initiating generation of the parity data when the data in the valid pages is programmed again.

16. The method according to claim 13, wherein determining the pages on which the dummy program operation is to be performed includes:
- when the number of valid pages is less than or equal to a reference number, determining that only one page in each of the plurality of memory blocks, among pages subsequent to the page in which the sudden power-off has occurred, is to be dummy-programmed.

17. The method according to claim 13, wherein controlling the resetting and generation of the parity data includes determining whether a size of the first group is to be maintained and whether the parity data is to be reset after the dummy program operation has been completed.

18. The method according to claim 17, further comprising:
- when the size of the first group is to be changed, storing information indicating a position of the dummy-programmed page and information about the changed size of the first group.

19. The method according to claim 17, wherein controlling the resetting and generation of the parity data includes:
- when the size of the first group is to be maintained, resetting the parity data.

20. The method according to claim 19, further comprising:
- controlling the memory device so that, after the parity data has been reset, new parity data is generated, and
- storing information about a position of a page at which generation of the new parity data is started.

* * * * *